United States Patent
A. K.

(10) Patent No.: US 11,546,361 B2
(45) Date of Patent: Jan. 3, 2023

(54) METHOD AND APPARATUS FOR ORGANIZING AND DETECTING SWARMS IN A NETWORK

(71) Applicant: Samsung Electronics Co., Ltd., Suwon-si (KR)

(72) Inventor: Mahesh Babu A. K., Noida (IN)

(73) Assignee: Samsung Electronics Co., Ltd., Suwon-si (KR)

(*) Notice: Subject to any disclaimer, the term of this patent is extended or adjusted under 35 U.S.C. 154(b) by 203 days.

(21) Appl. No.: 16/734,715

(22) Filed: Jan. 6, 2020

(65) Prior Publication Data
US 2020/0220887 A1 Jul. 9, 2020

(30) Foreign Application Priority Data
Jan. 4, 2019 (IN) .............................. 201911000514

(51) Int. Cl.
| | | |
|---|---|---|
| *G06F 11/07* | (2006.01) | |
| *H04L 9/40* | (2022.01) | |
| *G06F 9/54* | (2006.01) | |
| *G06N 5/04* | (2006.01) | |
| *H04L 5/00* | (2006.01) | |
| *H04W 12/63* | (2021.01) | |

(52) U.S. Cl.
CPC .......... *H04L 63/1425* (2013.01); *G06F 9/542* (2013.01); *G06N 5/043* (2013.01); *H04L 5/0067* (2013.01); *H04W 12/63* (2021.01)

(58) Field of Classification Search
CPC ... H04L 63/1425; H04L 5/0067; H04L 67/12; G06F 9/542; G06N 5/043; G06N 3/08; G06N 3/006; H04W 12/63; H04W 4/70
See application file for complete search history.

(56) References Cited

U.S. PATENT DOCUMENTS

| | | |
|---|---|---|
| 8,649,565 B1 | 2/2014 | Kim et al. |
| 9,336,480 B1 | 5/2016 | Owechko |
| 2007/0183670 A1 | 8/2007 | Owechko et al. |

(Continued)

FOREIGN PATENT DOCUMENTS

| | | |
|---|---|---|
| CN | 101509839 A | 8/1981 |
| CN | 102680242 A | 9/2012 |

(Continued)

OTHER PUBLICATIONS

CN106161204A "A kind of data transmission method in mobile social networking based on swarm intelligence" (Year: 2016).*

(Continued)

*Primary Examiner* — Craig C Dorais
*Assistant Examiner* — Abdou K Seye
(74) *Attorney, Agent, or Firm* — Jefferson IP Law, LLP

(57) ABSTRACT

A method and an apparatus for organization and detection of homogeneous and heterogeneous swarms of devices and application of swarm intelligence using swarm intelligence framework are provided. The Swarm Intelligence Framework provides a generic platform for realizing solutions involving Swarm Intelligence Technology via flexible container-based Algorithm Plug-in Architecture which is essential to utilize Swarm Intelligence Framework for various scenarios and use cases, including dynamically loading and using the Swarm Detection Algorithm.

13 Claims, 29 Drawing Sheets

(56) References Cited

U.S. PATENT DOCUMENTS

| | | | |
|---|---|---|---|
| 2010/0121955 A1 | | 5/2010 | Doganaksoy et al. |
| 2010/0306280 A1* | | 12/2010 | Sapek .................... G06F 16/27 |
| | | | 707/803 |
| 2012/0002569 A1 | | 1/2012 | Wong et al. |
| 2019/0049931 A1* | | 2/2019 | Tschirschnitz ..... G05B 19/4186 |
| 2020/0153843 A1* | | 5/2020 | Aksela ................. H04L 63/145 |

FOREIGN PATENT DOCUMENTS

| | | | |
|---|---|---|---|
| CN | 103206614 A | | 7/2013 |
| CN | 106161204 A | * | 11/2016 |
| JP | 5948167 B2 | | 7/2016 |
| KR | 10-1621614 B1 | | 5/2016 |
| WO | 2017059152 A1 | | 4/2017 |
| WO | 2018/094105 A2 | | 5/2018 |

OTHER PUBLICATIONS

Gabriel Arpino et al. "Using Information Invariants to Compare Swarm Algorithms and General Multi-Robot Algorithms", Gabriel hereinafter, Feb. 2018) . (Year: 2018).*

Manuele Brambilla et al.,"Swarm Intell Swarm robotics: a review from the swarm engineering perspective". Swarm Intelligence, Springer, 2013, 7 (1), pp. 1-41. 10.1007/s11721-012-0075-2. hal-01405919, May 2012.

Indian Office Action dated Jan. 22, 2021, issued in Indian Patent Application No. 201911000514.

Narahara, Self-organizing Computation A Framework for Generative Approaches to Architectural Design; Sep. 2010. The Harvard University Graduate School of Design.

International Search Report dated Apr. 24, 2020, issued in International Patent Application No. PCT/KR2020/000186.

* cited by examiner

METHOD AND APPARATUS FOR ORGANIZING AND DETECTING SWARMS IN A NETWORK

CROSS-REFERENCE TO RELATED APPLICATION(S)

This application is based on and claims priority under 35 U.S.C. § 119(a) of an Indian patent application number 201911000514 (CS), filed on Jan. 4, 2019, in the Indian Intellectual Property Office, the disclosure of which is incorporated by reference herein in its entirety.

BACKGROUND

1. Field

The disclosure relates to artificial intelligence. More particularly, the disclosure relates to a method and system for detecting swarms and an application of swarm intelligence using swarm intelligence framework.

2. Description of Related Art

Internet of Things (IoT) had brought in a myriad of opportunities to interface with a physical world in unprecedented ways by various means of sensors and actuators. The IoT ecosystem poses heterogeneity on one end of the spectrum. That is, the IoT devices or an edge of the interface to the physical world and the other end of the spectrum is predominantly homogeneous in nature centralized cloud environments. This requires a more flexible framework or a plug-in architecture so that the common reusable components could be utilized to accelerate solution development targeting specific verticals, scenarios or use cases. Also, the nature of interaction or the network topology of these IoT devices is varied and calls for a generic approach to be able to represent, detect and form swarms of devices for realizing useful and efficient solutions by applying swarm intelligence. This is where application of swarm Intelligence would be very effective as it is well suited for a distributed, de-centralized, and self-organizing system.

Swarm intelligence is a field of biologically-inspired artificial intelligence based on the behavioral models of social swarms such as ants, termites, bees, wasps, flock of birds, and school of fish. Despite availability of many well established nature inspired swarm intelligence techniques such as Ant Colony Optimization (ACO), Particle Swarm Optimization (PSO), Artificial Bee Colony Optimization (ABC) etc., it would be very expensive to realize a unique end-to-end solution by building all of the elements like underlying infrastructure, connectivity, re-usable components from scratch for solving the actual problems. Therefore, there is a need for an innovation in enabling reuse of common functionality of the swarm intelligence techniques that are reusable for various scenarios allowing flexibility to customize only the portion that is required to be adapted or changed to suit the needs the scenario or use case.

CN 101509839A discloses a method for trunked industrial robotic based clustering and utilizing an outlier mining method belonging to the field of fault diagnosis of electrochemical equipment. However, the method is specific to fault diagnosis for trunked industrial robotics and does not allow reuse of the same for various verticals, scenario or use case.

CN 103206614A discloses an early-warning device and an early-warning method used for monitoring the accidents of boiling liquid expanding vapor explosion (BLEVE) of pressuring-bearing storage tanks. According to the method, various parameters in the pressure-bearing storage tanks are detected by corresponding detection components to monitor and obtain early warning on the accidents of BLEVE of pressure-bearing storage tanks. However, the method is specific to fault diagnosis for trunked industrial robotics and does not allow reuse of the same for varied verticals, scenario or use case.

"Improved email spam detection model with negative selection algorithm and particle swarm optimization" (Ismaila Idris, May, 2014) discloses an email spam detection model based on negative selection algorithm and particle swarm optimization (NSA-PSO). To cope with the trend of email spam, a novel model that improves the random generation of a detector in negative selection algorithm (NSA) with the use of stochastic distribution to model the data point using particle swarm optimization (PSO). Local outlier factor is introduced as the fitness function to determine the local best (Pbest) of the candidate detector that gives the optimum solution.

WO2017059152A1 discloses Self-Organizing swarm intelligent wells using machine learning algorithm but is very specific to the swarm intelligence based operated well using predictive model for achieving a target result. However, the disclosure may not allow reuse of the same for varied verticals, scenario or use case.

Hence, there is a need of a system and method thereof which adapts to the dynamic nature of network of connected devices in the IoT ecosystem and multitude of scenarios for each of the verticals for adapting the algorithms/customizing it to suite specific use case/scenario.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a plurality of contents for organization and detection of swarms and application of swarm intelligence using swarm intelligence framework.

Additional aspects will be set forth in part in the description which follows and, in part, will be apparent from the description, or may be learned by practice of the presented embodiments.

For example, various embodiments herein may include one or more platforms and methods for providing a plurality of contents to organization and detection of swarms and application of swarm intelligence using swarm intelligence framework in a node-control system or server arrangement.

In accordance with an aspect of the disclosure, a method of detecting swarms in a network is provided. The method includes receiving input characteristics of nodes in the network, generating a matrix representing a connectivity graph of devices based on the input characteristics, and detecting swarms based on an analysis of the input characteristics and the matrix.

In an embodiment, the method further includes detecting connection and disconnection among the nodes.

In an embodiment, the input characteristics of the nodes include at least one of proximity among the nodes, homogeneity of the nodes, network parameters, or information on connection or disconnection among the nodes.

In an embodiment, the proximity among the nodes indicates signal strength among the nodes.

In an embodiment, the detecting of the swarms comprises detecting whether the swarms are homogeneous or heterogeneous.

In an embodiment, the method includes detecting an anomalous node or a malicious node based on consensus algorithm or an agreement by neighboring nodes in the network, wherein the neighboring nodes are nodes located close each other and the consensus algorithm is plugged in a plug-in architecture.

In an embodiment, the detecting of the anomalous node or the malicious node includes transmitting a detection status to an electronic device.

In an embodiment, the method includes selecting at least one algorithm based on at least one predefined parameter, type of nodes, or network characteristics.

In an embodiment, the at least one algorithm is a pluggable algorithm which is plugged-in using a container-based algorithm plug-in architecture.

In an embodiment, the container-based algorithm plug-in architecture enables binary level reuse of the at least one algorithm in different applications.

In an embodiment, the at least one algorithm is a generic swarm detection algorithm using a set inclusion and a node degree representing a number of edges connected to at least one node among the nodes.

In an embodiment, the method includes notifying the detected swarm to a monitoring unit.

In an embodiment, initializing connectivity among the nodes in the detected swarm for communication, and sharing data among the nodes in the detected swarm.

In accordance with another aspect of the disclosure, an apparatus for detecting swarms in a network is provided. The apparatus includes a memory to store instructions, at least one processor, by executing the instructions, configured to receive input characteristics of nodes in the network, generate a matrix representing a connectivity graph of devices based on the input characteristics, and detect swarms based on an analysis of the input characteristics and the matrix.

In another embodiment, a swarm intelligence framework is configured to traverse through an adjacency matrix following a node degree of each of the plurality of nodes to determine the edges and building a list of elements that are potential candidates of a swarm, and construct a plurality of possible swarm vectors—posswarms. Further, the swarm intelligence framework is configured to: sort the plurality of swarm vectors to prepare for set operations by iteratively comparing each element in the possible swarm vector—posswarms[i] and intersecting with the next swarm vector—posswarms[i+1] to determine potential swarms containing two or more nodes; add a plurality of swarm elements to the detected swarm vector if there are no swarm elements in the detected swarm vector to from a set; intersect, to find if the detected swarm vector set is already existing or it is exclusive; check, in case of matched node degree, the new one is bigger set than the one exists and if so, erase the old one and include the new one; prune out a plurality of sub-swarms and finalize the swarm detection by performing set union to eliminate redundant sub-swarms; determine a plurality of indices of a plurality of swarm sets to be pruned out; enumerate through a list of indices of the plurality of swarm sets to be removed and remove the redundant swarm(s) to obtain the final vector of swarm that is desired; and update the output vector with the final detected swarm.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
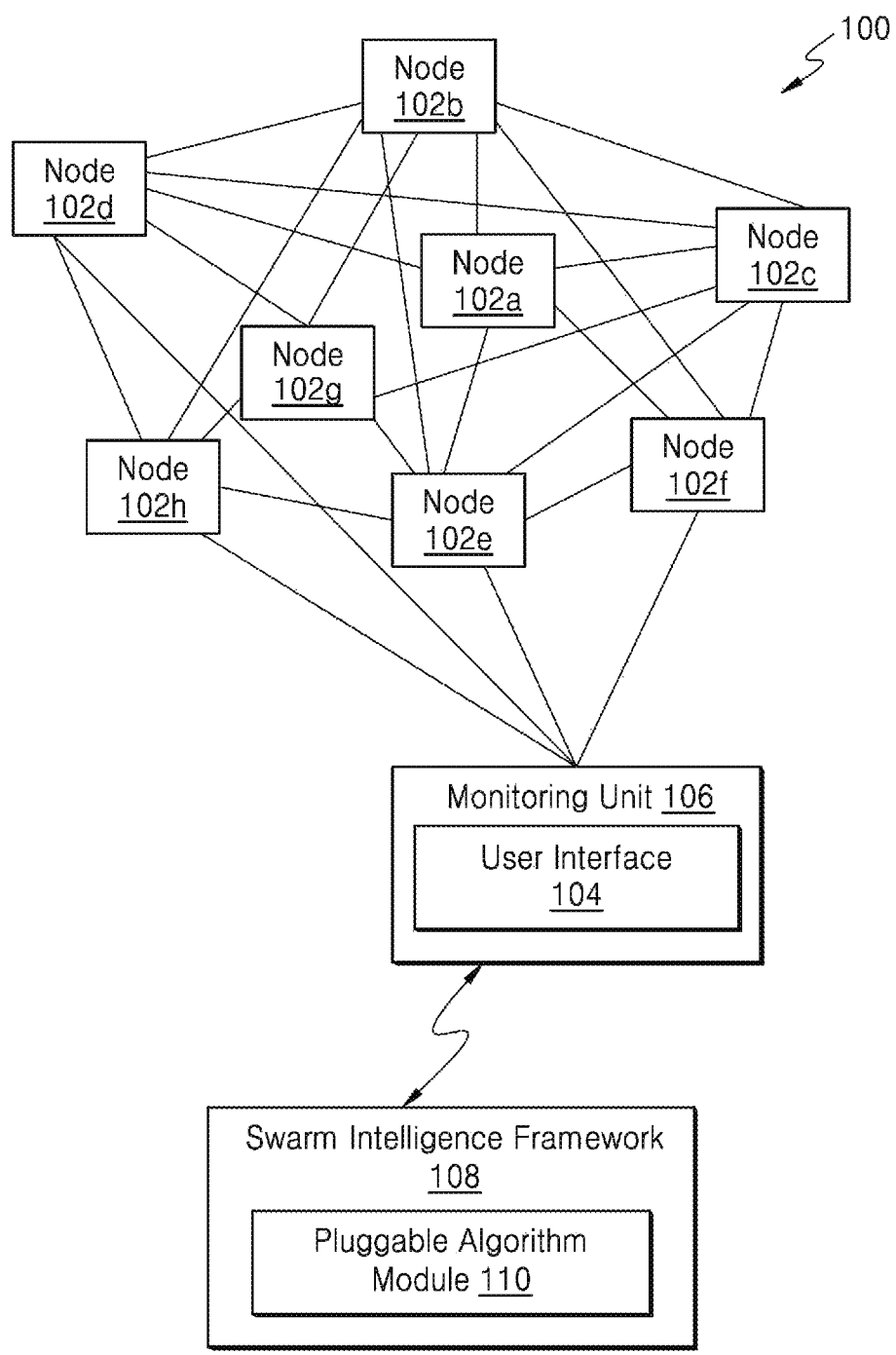
FIG. 1 illustrates an architecture of swarm intelligence system for organization and detection of swarms, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments of the disclosure will be described below in detail with reference to the accompanying drawings.

The various embodiments of the disclosure provide a plurality of contents for organization and detection of swarms and application of swarm intelligence using swarm intelligence framework.

Furthermore, connections between components and/or modules within the drawings are not intended to be limited to direct connections. Rather, these components and modules may be modified, reformatted or otherwise changed by intermediary components and modules.

Swarm intelligence (SI) is a decentralized self-organizing system. SI systems or a SI-based network show collective behaviors of decentralized, self-organized systems, natural or artificial. Generally, SI systems may consist of a population of simple agents or nodes interacting locally with one another and with their environment. The SI is inspired by nature, especially biological systems. The agents follow very simple rules but generally there is no centralized control structure dictating how individual agents should behave, local, and to a certain degree random, interactions between such agents lead to the emergence of "intelligent" global behavior, unknown to the individual agents. Typical examples of SI in natural system may include ant colonies, bird flocking, hawks hunting, animal herding, bacterial growth, fish schooling and microbial intelligence.

"Collective behavior" represents an overall behavior of a set of devices in the swarm. The decision making is performed collectively to adjust properties of swarm in an SI system.

"Decentralized" represents the following. In the SI system, there is no central node or device in the swarm controlling or communicating as master with the nodes of swarm. Each node is independent unit communicating independently with other nodes. Thus, each node is decentralized because of its independency.

"Self-organized systems" represent the following. Swarms organize themselves automatically by collective decision making based on building common consensus.

"Simple nodes or agents" represent that nodes in swarm are simple devices without the need of any computationally intensive tasks. To a certain degree of randomness, interactions between nodes or agents are preferred.

"IoTivity" is an open source software framework enabling seamless device-to-device connectivity to meet the emerging needs of the IoTs. The IoTivity delivers an open source implementation of Open Connectivity Foundation (OCF) specification to ensure these emerging IoT devices that can connect securely and reliably to the Internet and to each other.

"Cloud Computing vs Edge Computing." Up until now, most of the data collected from the devices (sensors or actuators of the devices) in IoT environments were transmitted to the cloud and then processed in the cloud in a centralized manner. This method involves a lot of latency and would not be suitable for scenarios that require actionable insights in real-time. Conversely, edge computing enables processing the data right at the source of the data (from sensors or actuators) i.e. on the device or near the device itself in a more de-centralized and distributed manner. The de-centralized and distributed aspects of edge computing are also very synonymous characteristic in SI. Gartner's hype cycle edge computing and IoT platform may be one of the top emerging technologies in the near future.

The application of swarm principles to robots is called swarm robotics, while 'swarm intelligence' refers to the more general set of algorithms.

With an advent of the internet and the cost and size of microprocessors have declined drastically, IoT has enabled multitude of possible scenarios for smart automation by collecting all the data involving sensors or actuators and being able to derive information and make informed decisions. Further, the data collected from these huge set of devices (sensors) could be handled and processed either in the cloud far away from the source of the data or right at the source of the data (which is called 'edge' or the 'IoT node') itself. There are many real-time scenarios which call for processing data right on the device (edge or IoT node) and have actionable insights in real-time which are not possible with cloud environments because of its centralized nature and latency involved. This is where an application of SI would be very effective as the SI is well suited for a distributed, de-centralized, self-organizing system. Also, since a large population is important for the success and accuracy of solution through SI, processing a large set of IoT devices (nodes) is analogous to large population that is required by SI algorithms.

In an embodiment, the disclosure provides a method of organizing and detecting swarms in a swarm intelligence framework. The swarm intelligence framework may be performed in any electronic device. Thus, the swarm intelligence framework may be used interchangeably with an electronic device or a server in the detailed description. The disclosure also provides a method of organizing and detecting homogeneous and heterogeneous swarm of devices by application of SI using swarm intelligence framework. The swarm intelligence framework provides a generic platform for realizing solutions involving SI technology by means of flexible container-based algorithm plug-in architecture which is very essential to utilize swarm intelligence framework for various scenarios and/or use cases, including dynamically loading and using the swarm detection algorithm. The method includes configuring and instantiating all components, modules, sub-modules of the swarm intelligence framework. The method includes configuring a swarm intelligence system core engine by loading required configurations. The method includes creating and configuring an inference engine to receive a plurality of input characteristics of a set of nodes in a network. The method includes processing the received input characteristics of the set of nodes in the network to generate an adjacency matrix of the network of the set of nodes by the inference engine. Further, the method includes dynamically loading a swarm detection algorithm and performing swarm detection based on the adjacency matrix of the network of the set of nodes generated by the inference engine, notifying a detected swarm to a monitoring unit by an algorithm container integrated through a container based-algorithm plug-in architecture. The method further includes repeating the step of swarm detection in case of node(s) connection or disconnections. The above-noted method may be executed or processed by an electronic device enabling to perform the swarm intelligence framework.

In an embodiment, the loading of required configurations to the swarm intelligence system core engine is performed using a plurality of configuration utilities. The required configuration of the swarm intelligence system core engine includes a nodes connections or disconnections detection method.

In an embodiment, the inference engine created and configured to receive a plurality of input characteristics of a set of nodes in a network is adaptable, customizable and reusable.

In an embodiment, the selection of the swarm detection algorithm includes selection of the swarm detection algorithm based on specific configuration dynamically by the container-based algorithm plug-in architecture. Further, the detector algorithms including, but not limited to, swarm detection algorithm or anomaly detector algorithm are loaded dynamically by the algorithm container.

In an embodiment, the container-based algorithm plug-in architecture used to organize and detect homogeneous and heterogeneous swarm of devices by applying SI by the swarm intelligence framework is a generic dynamic algorithm plug-in architecture. The generic swarm detection algorithm is applied to detect the swarms generic swarm detection algorithm is applied to detect the swarms. The swarm detection algorithm is the generic swarm detection algorithm using a node degree and a set inclusion.

In an embodiment, the swarm detection includes automatically detecting node connection and disconnection and re-constitution of swarm.

In an embodiment, the swarm detection and organization further include optimizing the communication among the nodes in the swarm.

In an embodiment, the selection of the swarm detection algorithm includes plug-in swarm algorithm for creating and representing swarm and/or context specific algorithm.

In an embodiment, the processing of the input and/or system characteristics by the inference engine for generation of a connectivity graph of a plurality of swarm agents on the devices further includes representing the connectivity graph as the adjacency matrix. The adjacency matrix represents the connectivity of the devices based on the plurality of input characteristics. The adjacency matrix is generated based on at least one of simple specifications, a validation specification (key value pairs), a neural network and/or machine learning.

In an embodiment, the swarm detection algorithm is a pluggable algorithm that is plugged-in using the container-based algorithm plug-in architecture. The algorithm container and container-based algorithm plug-in architecture enables binary level reuse of a plurality of pluggable algorithms that conform to well-defined algorithm interface which is dynamically loaded. The algorithms are loaded dynamically using the container-based algorithm plug-in architecture to enable the plurality of pluggable algorithms to be used for adapting, customizing the algorithms and/or logic. The container-based algorithm plug-in architecture can add or select at least one of the algorithms based on at least one of predefined parameters, type of nodes, and network characteristics. The network characteristics are based on a plurality of network parameters such as at least one of connection/disconnection of nodes, a plurality of properties of nodes, at least one of re-constitution of nodes.

In an embodiment, the detecting an anomalous or malicious node based on majority consensus and/or agreement by the neighboring nodes is performed through a consensus algorithm.

In an embodiment, the method includes organizing and detecting swarms in a swarm intelligence framework. The swarm detection by the swarm detection algorithm includes traversing through the adjacency matrix following the node degree of each node to determine the edges and building a list of elements that are potential candidates of a swarm. The node degree is the number of edges connected to the node. In terms of the adjacency matrix A, the degree for a node indexed by i in an undirected network is ki=Σjaij, where the sum is over all nodes in the network. An edge node or an edge is a device that acts as an end user portal for communication with other nodes in cluster computing. Edge nodes are at times called gateway nodes or edge communication nodes.

The swarm detection by the swarm detection algorithm includes constructing a plurality of possible swarm vectors—'posswarms'.

The swarm detection by the swarm detection algorithm includes sorting the vector to prepare for set operations by iteratively comparing each element in the possible swarm vector 'posswarms[i]' and intersecting with the next 'posswarms[i+1]' to determine potential swarms containing 2 or more nodes. The method further includes adding a plurality of swarm elements to the detected swarm vector if there are no swarm elements in the detected swarm vector to form a set. Subsequently, the swarm detection by the swarm detection algorithm includes intersecting to find if the detected swarm vector set is already existing or the detected swarm vector set is exclusive, checking whether the node degree matches and whether the new swarm vector set is bigger than the existing swarm vector set and if so, erasing the old swarm vector set and including the new swarm vector set. The method further includes pruning out a plurality of sub-swarms and finalizing the swarm detection by performing set union to eliminate redundant sub-swarms, determining a plurality of indices of a plurality of swarm vector sets to be pruned out, enumerating through a list of indices of the plurality of swarm vector sets to be removed and removing the redundant swarm(s) to obtain the final swarm vector set that is desired and updating the output vector with the obtained final swarm vector set.

According to an embodiment, the container-based algorithm plug-in architecture in the swarm intelligence framework organizes and detects the swarms using the node degree, the set inclusion approach and/or the plug-in algorithms.

In an embodiment, the disclosure provides a method of organizing and detecting swarms in a swarm intelligence framework. The method includes configuring and instantiating all components, modules, and/or sub-modules of a swarm intelligence framework. The method includes configuring a swarm intelligence system core engine by loading required configurations. The method includes creating and configuring an inference engine to receive a plurality of input characteristics of a set of nodes in a network. The method includes processing the received input characteristics of the set of nodes in the network to generate an adjacency matrix of the network of the set of nodes by the inference engine. Further, the method includes dynamically loading a swarm detection algorithm and performing swarm detection based on the adjacency matrix of the network of the set of nodes generated by the inference engine, notifying a detected swarm to a monitoring unit by an algorithm container integrated through a container-based algorithm plug-in architecture. Further, the method includes initializing seamless connectivity among the nodes in the detected swarms for communication and continuously sharing data among the nodes in the swarm. Subsequently, the method includes dynamically loading, by the algorithm container integrated through the container-based algorithm plug-in architecture, an anomaly detector algorithm or a use case specific algorithm based on the scenario or configuration, performing an anomaly detection using a consensus algorithm, notifying detection status and identifying anomalous nodes and repeating the step of the anomaly detection in case of the node connection and/or disconnection. The method further includes repeating the step of swarm detection in case of node(s) connection and/or disconnection.

In an embodiment, the method of organizing and detecting swarms in a swarm intelligence framework includes loading the algorithms dynamically by the container-based algorithm plug-in architecture. The loading of the algorithms by the container-based algorithm plug-in architecture includes analyzing the at least one configuration utility to extract the path of a shared algorithm library to load the shared algorithm library by the algorithm container. Subsequently, the loading of the algorithms by the container-based algorithm plug-in architecture includes conforming the plurality of pluggable algorithms needs to be able to be loaded and used by the swarm intelligence framework by an algorithm interface, loading dynamically the shared algorithm library without a need to recompile the swarm intelligence framework components and determining the outcome based on the logic within the shared algorithm.

According to an embodiment, the algorithm conforming to an algorithm interface is dynamically loaded by the algorithm container.

In an embodiment, the method of organizing and detecting swarms in a swarm intelligence framework includes generating the adjacency matrix by the inference engine. The generating of the adjacency matrix includes comparing a key, at least one value pair against at least one threshold (validation specification) when uni-dimension parameters are to be considered and transforming the plurality of input characteristics in a form that can be represented and processed as a neural network. Subsequently, the generating of the adjacency matrix includes performing quick convergence to maximize or minimize the weights of the neural network based on the input specification (objective function) by using a particle swarm optimization, determining whether the resultant output is within the thresholds by using the validation specification, and forming the adjacency matrix representing connections of the nodes in the network.

According to an embodiment, the inference engine obtains the right adjacency matrix representing the network of the set of nodes by using the machine learning.

In an embodiment, the method of organizing and detecting swarms in a swarm intelligence framework includes an anomaly detection by the anomaly detector algorithm. The anomaly detection includes composing, by each of the plurality of nodes, a plurality of status data points. The anomaly detection includes communicating their current status data points by each of the plurality of nodes in the swarm to their neighboring nodes in the swarm they belong to. Subsequently, the anomaly detection includes evaluating by each of the plurality of nodes, the status data points provided by its neighboring nodes against a defined threshold, and detecting an outlier based on the threshold and communicating the outlier information among the neighboring nodes. The anomaly detection includes detecting, by the consensus algorithm, the anomalous, malicious, or attacked node based on majority consensus and/or agreement by the neighboring nodes, and determining whether the anomaly is a known anomaly and classifying the anomaly based on the type of attack.

According to an embodiment, configuration of the node can be updated to all the nodes using the available connectivity once one of the nodes is re-configured and integrity of updates to entire set of nodes is validated using the consensus algorithm.

In an embodiment, the disclosure provides a system of organizing and detecting swarms in a swarm intelligence framework. The system includes the swarm intelligence framework configured to enable reuse of components for identifying nodes, provide connectivity of nodes, perform exchange of data, and enable implementation of custom algorithms to organize and detect swarms, a plurality of pluggable algorithm containers; and a monitoring unit configured to act as a swarm intelligence user interface.

In an embodiment, the swarm intelligence framework includes a plurality of communication components, a plurality of configurations of a swarm network, a plurality of dynamically loaded pluggable algorithms, at least one swarm intelligence system core engine, a swarm intelligence framework utilities module, an engine agent, and a framework agent. The plurality of communication components are configured to provide interaction among the swarm of a plurality of nodes and communication from a plurality of nodes to an access point and from the access point to the monitoring unit. The swarm intelligence framework includes the plurality of configurations of a swarm network to provide well defined application programming interfaces (APIs) to access the swarm network and/or node information of the plurality of nodes. The swarm intelligence system core engine is configured to provide flexibility, customization capability by means of a plurality of configuration utilities for configuring the plurality of node configurations, access point, at least one algorithm containers, and the plurality of pluggable algorithms. The swarm intelligence framework utilities module is configured to provide a set of reusable utilities including persistence, logging diagnostics, network diagnostics, configuration utilities, programmable I/O(s). The engine agent is configured to provide an interface to core engine and external access points through a message based architecture, and the framework agent is configured to implement a server and expose an interface for notifications and updates to the monitoring unit.

In another embodiment, the swarm intelligence system core engine may include an IoT Framework module, a message notifier module, an inference engine module, an algorithm container, and a container-based algorithm plug-in architecture. The IoT Framework module is configured to form a layer on a top of IoT stack. The message notifier module is configured to implement a generic message notifier using a higher level interface abstraction for message notifications from the plurality of nodes in the swarm to the access points. The inference engine module is configured to implement an inference engine to process the input characteristics of the network topology and/or configuration of the swarm of the plurality of nodes to generate a connectivity graph of the plurality of nodes. The algorithm container is configured to enable binary level reuse of the plurality of dynamically loaded pluggable algorithms that conform to well-defined algorithm interface. The container-based algorithm plug-in architecture is configured to enable binary level reuse of the plurality of dynamically loaded pluggable algorithms that conform to well-defined algorithm interface.

In an embodiment, the IoT Framework module is implemented with abstraction so that the underlying communication infrastructure could be easily replaced if needed.

In an embodiment, the container-based algorithm plug-in architecture of the swarm intelligence framework is the container-based algorithm plug-in architecture with pluggable swarm algorithms, pluggable logic/anomaly/threat detection algorithms, and a generic swarm detection algorithm. The algorithms are loaded dynamically and executed by the container-based algorithm plug-in architecture. The container-based algorithm plug-in architecture of the swarm intelligence framework may add or select at least one of the algorithms based on at least one of predefined parameters, type of nodes, and/or network characteristics.

According to an embodiment, the swarm intelligence framework is configured to detect anomaly in nodes using a consensus algorithm. The consensus algorithm is plugged-in through a container-based algorithm plug-in architecture.

In another embodiment, the inference engine of the swarm intelligence framework is adaptable, customizable and reusable for various scenarios or use cases which will be described in detail.

In an embodiment, the swarm intelligence framework generates an adjacency matrix based on at least one of simple specifications, a validation specification (key value pairs), and/or a neural network with optimization of weights using partial swarm optimization (PSO) for transforming multi-dimensional characteristics and machine learning. The adjacency matrix generated by the swarm intelligence framework represents a connectivity of the devices based on the plurality of input characteristics.

According to an embodiment, the network characteristics are based on a plurality of network parameters, at least one of connection/disconnection of nodes, a plurality of properties of nodes, and/or re-constitution of nodes.

In an embodiment, the system organizes and detects homogeneous and heterogeneous swarm of devices by application of swarm intelligence by the swarm intelligence framework through the container-based algorithm plug-in architecture, where the container-based algorithm plug-in architecture is a generic dynamic algorithm plug-in architecture. The swarm detection algorithm is the generic swarm detection algorithm using a node degree and a set inclusion approach.

In an embodiment, the inference engine is used to process the input/system characteristics and generate the connectivity graph of a plurality of swarm agents on the devices. The connectivity graph is represented as an adjacency matrix.

In an embodiment, the swarm detection algorithm is the pluggable algorithm that is plugged-in using the container-based algorithm plug-in architecture.

According to an embodiment, the algorithm container enables binary level reuse of the plurality of pluggable algorithms that conform to well-defined algorithm interface which is dynamically loaded.

According to an embodiment, the swarm algorithm container plug-in enables binary level reuse of the plurality of pluggable algorithms that conform to well-defined algorithm interface which is dynamically loaded. The algorithms are loaded dynamically using the container-based algorithm plug-in architecture to enable the plurality of pluggable algorithms to be used for adapting, customizing the algorithms. The container-based algorithm plug-in architecture in the swarm intelligence framework organizes and detects swarms using the node degree, the set inclusion approach and plug-in algorithms.

In an embodiment, the swarm intelligence framework of the system for organizing and detecting swarms in a swarm intelligence framework may be configured to traverse an adjacency matrix following a node degree of each of the plurality of nodes to determine the edges and building a list of elements that are potential candidates of a swarm, construct a plurality of possible swarm vectors 'posswarms', and sort the plurality of swarm vectors to prepare for set operations by iteratively comparing each element in the possible swarm vector 'posswarms[i]' and intersecting with the next 'posswarms[i+1]' to determine potential swarms containing 2 or above nodes.

The swarm intelligence framework of the system may be further configured to add a plurality of swarm elements to the detected swarm vector if there are no swarm elements in the detected swarm vector to form a set, intersect the swarm vector, to find if the detected swarm vector set is already existing or it is exclusive, check based on matched node degree, the new swarm vector set is a bigger set than the existing swarm vector set. If the new swarm vector set is a bigger one, then the swarm intelligence framework may erase the old one and replace with the new one, prune out a plurality of sub-swarms. The swarm intelligence framework may finalize the swarm detection as follows. The swarm intelligence framework may perform a set union by eliminating redundant sub-swarms, determine a plurality of indices of a plurality of swarm sets to be pruned out, enumerate a list of indices of the plurality of swarm sets to be removed, remove the redundant swarms to obtain the final swarm vector that is desired, and update the output vector with the finally detected swarm.

In an embodiment, the container based algorithm plug-in architecture with pluggable swarm algorithms, pluggable logic/anomaly and/or threat detection algorithms, and the swarm detection algorithm of swarm intelligence framework comprise at least one algorithm interface to which every pluggable algorithm to be implemented needs to conform and be able to be loaded and used by the swarm intelligence framework, at least one shared algorithm library, at least one configuration utility. The configuration utility defines all type of algorithms that can be loaded where a particular shared algorithm library is located, and from where the particular shared algorithm library has to be actually loaded. The algorithm container in the swarm intelligence framework may be configured to analyze the configuration utility to extract the path of the shared algorithm library to load the shared algorithm library, dynamically load the shared algorithm library without the need to recompile the swarm intelligence framework components, and determine the outcome based on the logic within the dynamically loaded shared algorithm library.

In an embodiment, the algorithm conforming to algorithm interface is dynamically loaded by the algorithm container integrated through a container-based algorithm plug-in architecture.

The proposed method and system may provide a method for automatically detecting node connection and/or disconnection, and re-constitution of swarms. Further, the proposed method and system may provide a method for optimizing the communication among the nodes in the swarm using swarm IoTivity. Another significant part of the disclosure enables plug-in swarm algorithm to create and represent swarms, context specific algorithm to provide a solution to a specific problem such as anomaly detection in an IoT environment using an algorithm container plug-in architecture. This provides a binary level reuse of the underlying framework components with an ability to dynamically load specific algorithms available as a sharable module (binary) as required for the scenario.

FIG. 1 illustrates an architecture of swarm intelligence system for organization and detection of swarms, according to an embodiment of the disclosure.

Referring to FIG. 1, the swarm intelligence system 100 may include a swarm intelligence framework 108 including a pluggable algorithm module 110. The swarm intelligence system 100 may further include a monitoring unit 106 which may act as a swarm intelligence user interface having a user interface (UI) 104 and a plurality of nodes 102a-102n of the swarm network. The UI (104) is user-specific and configured to provide connectivity between a monitoring unit 106 and the plurality of nodes 102a-102n of the swarm network.

Figure 2:
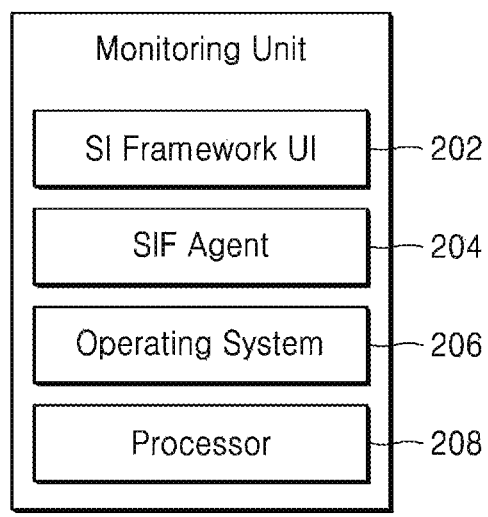
FIG. 2 illustrates a schematic diagram depicting a monitoring unit, according to an embodiment of the disclosure.

FIG. 2 illustrates a schematic diagram depicting a monitoring unit 106, according to an embodiment of the disclosure. The monitoring unit 106 may act as a swarm intelligence user interface. The monitoring unit 106 may include a processor 208 hosting an operating system 206, SI framework agent 204 and SI Framework UI 202 for monitoring nodes' activities and simulating attack injection. Further, the SI framework agent 204 implements, for example, a C++ REST Server, exposes a REST API interface for notifications, and updates to the SIS UI (Monitoring Unit). Further, the SI Framework UI 202 provides a thin client browser based UI implemented in, for example, HTML5/JS which can be run in any browser such as Firefox™, Chrome™ or Internet Explorer™ across various platforms windows, Linux™ (Ubuntu™), and the like.

Referring to FIG. 2, Swarm intelligence System (SIS) is a complete solution for use and application of Swarm Intelligence for solving complex problems with simple set of rules governed by the principles of Swarm Intelligence. SIS consists of Swarm Intelligence Framework which enables reuse of components for identifying nodes (e.g., IoT devices), connectivity, exchange of data and enabling implementation of custom algorithms to suit specific needs of the scenario or use case. Swarm Intelligence Framework particularly is well-suited for IoT devices and/or IoT Ecosystem.

Figure 3:
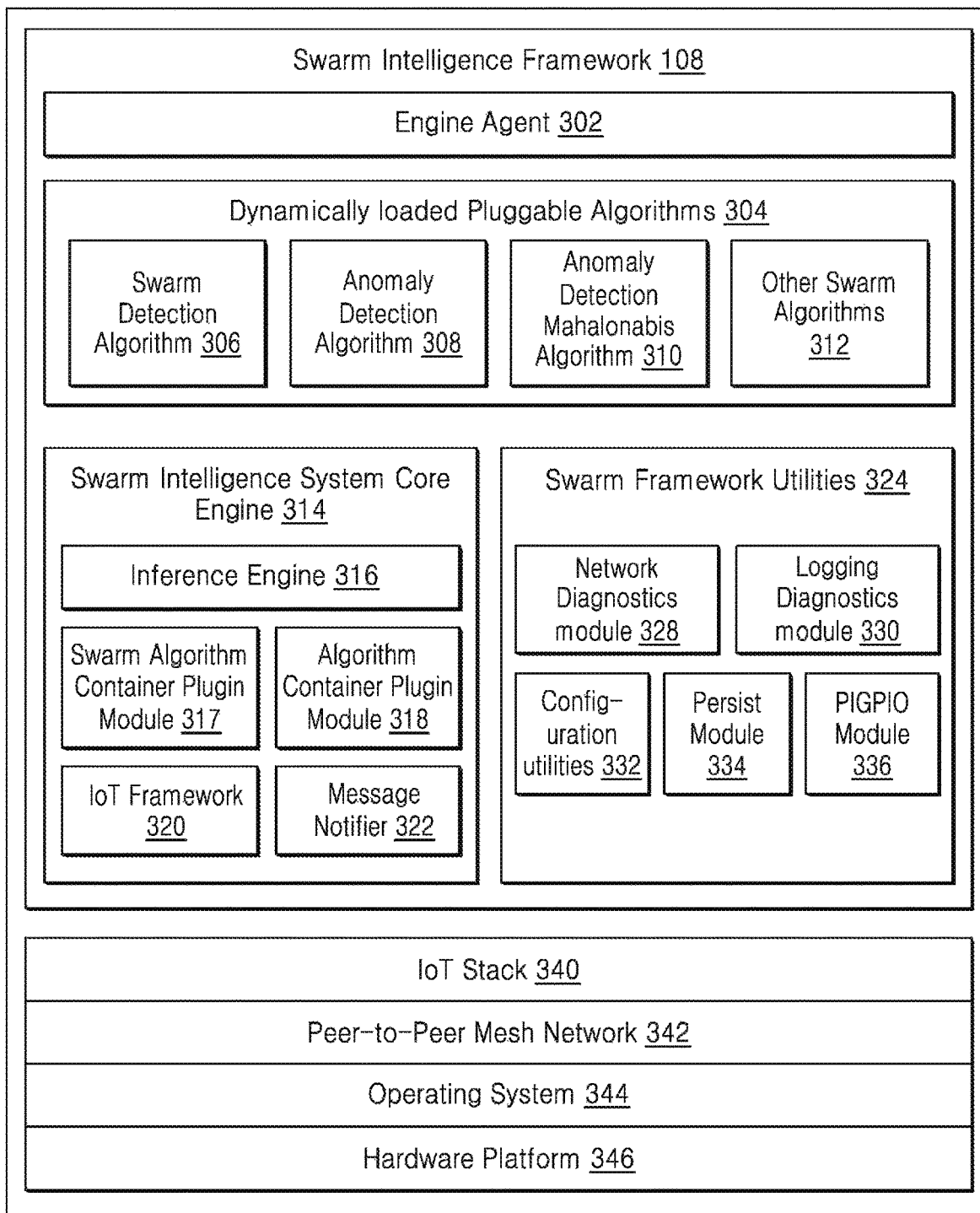
FIG. 3 illustrates a schematic diagram depicting a swarm intelligence framework 108, according to an embodiment of the disclosure.

FIG. 3 illustrates a schematic diagram depicting a swarm intelligence framework 108, according to an embodiment of the disclosure. In an embodiment, the swarm intelligence framework 108 includes an engine agent 302, a plurality of dynamically loaded pluggable algorithms 304 which includes, but not limited to, a swarm detection algorithm 306, anomaly detection algorithm 308, anomaly detection mahalonabis algorithm 310, and other swarm algorithms 312. The dynamically loaded pluggable algorithms 304 may also include a plurality of other swarm algorithms which are not shown in the FIG. 3. Further, the swarm intelligence framework 108 may further include a swarm intelligence system core engine 314, swarm framework utilities 324, an IoT stack 340, a peer-to-peer mesh network 342 such as Better Approach To Mobile Adhoc Networking (B.A.T-.M.A.N.) protocol, an operating system 344 and the hardware platform 346 which hosts the operating system (344). The swarm intelligence system core engine 314 may include an inference engine 316, a swarm algorithm container plug-in module 317, an algorithm container plug-in module 318, an IoT Framework 320 and a message notifier 322. The swarm framework utilities 324 may include a network diagnostics module 328, a logging diagnostics module 330, a configuration utilities module 332, a persist module 334 and a PIGPIO module 336.

Referring to FIG. 3, the Swarm intelligence framework 108 follows a layered architecture and is built on, for example, Tizen OS and/or the IoT Stack 340 (OCF Standard) for communication among IoT nodes 102a-102n. The Swarm intelligence framework 108 provides all of the communication components for interaction among the swarm of nodes (for example, IoT devices) and communication from nodes to an access point and from an access point to the monitoring unit 106. The Swarm intelligence framework 108 holds all of the configurations of the swarm network and provides well-defined APIs to access the swarm network and/or node information. Further, the Swarm intelligence framework 108 provides a set of reusable utilities for Persistence, Logging, XML based configuration, Programmable I/O etc. The Swarm intelligence framework 108 further provides an engine agent 302 for interface to swarm intelligence system core engine 314 and external access points through a message based architecture.

The swarm Intelligence system core engine 314 includes the IoT Framework 320 which may be a swarm based seamless device to device connectivity module based on IoT protocol. The IoT Framework 320 may be located on a top layer of the IoT stack 340 but is completely implemented with an abstraction so that the underlying communication infrastructure could be easily replaced (if needed). Further, the swarm Intelligence system core engine 314 includes a message notifier 322 using a higher level interface abstraction for message notifications from the nodes 102a-102n in the swarm to access points. This communication is typically TCP socket based but can be replaced by any other viable communication method as required. The swarm Intelligence system core engine 314 may further include an inference engine 316 which is used to analyze the input characteristics. The input characteristics may be the network nodes' behavioral input such as proximity or affinity between nodes determined based on signal strength of wireless network of WiFi or Bluetooth, homogeneity of the network, or other behavioral input or system characteristics of the network nodes or configuration of the swarm of nodes 102a-102n Based on the analysis of the input characteristics, a connectivity graph of nodes which is used by various swarm algorithms including the generic swarm detection algorithm may be generated. The most important part of the swarm intelligence system core engine 314 is the algorithm container plug-in module 318 and swarm algorithm container plug-in module 317 which enables binary level reuse of pluggable algorithms that conform to well-defined interface which is dynamically loaded and used to suit specific scenarios and/or use cases. The swarm intelligence system core engine 314 provides flexibility customization capability by means of configuration utilities, for example, XML based configurations for configuring the node configurations, access points, algorithm containers, or pluggable algorithms.

Figure 4:
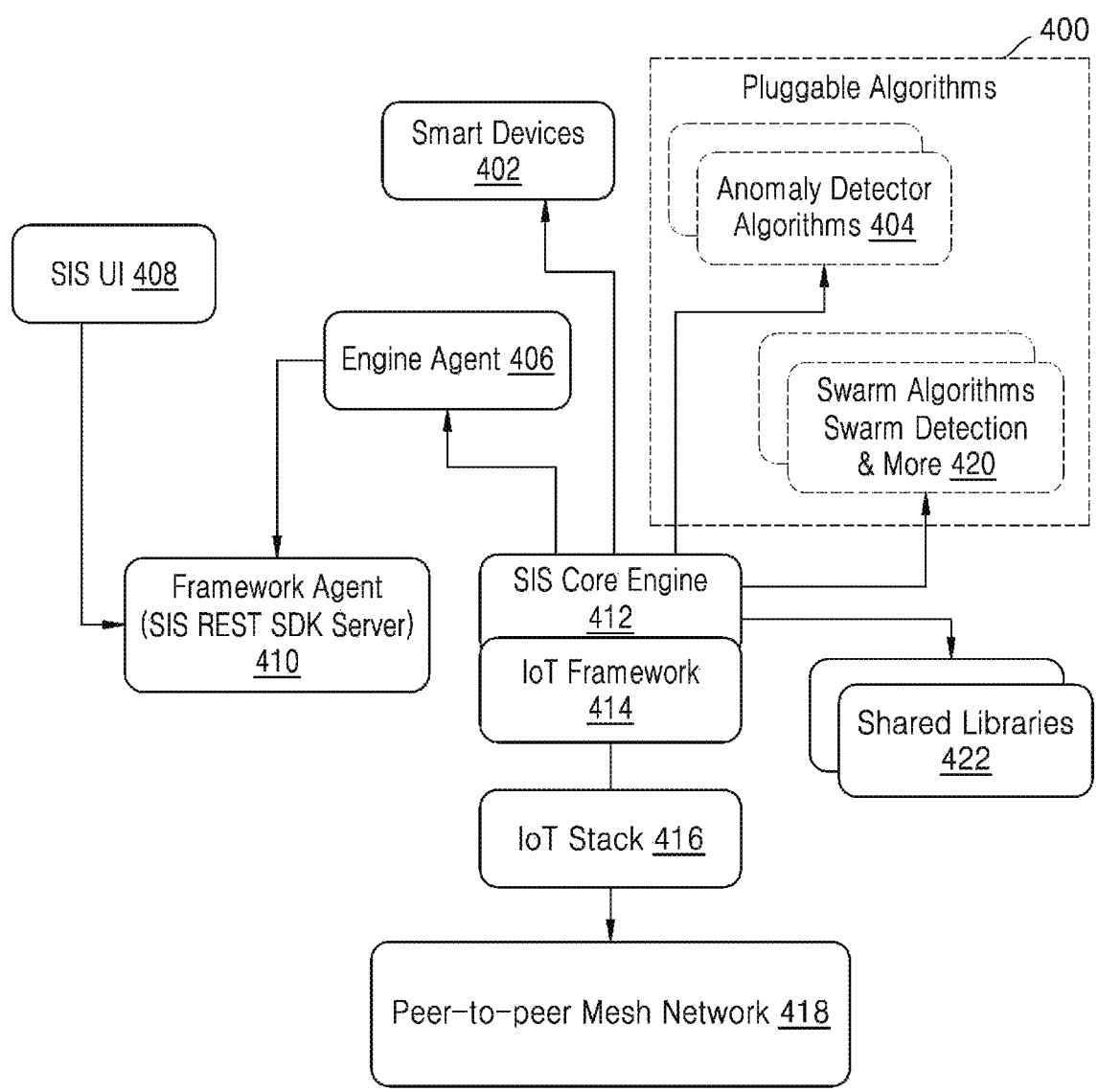
FIG. 4 illustrates a schematic diagram depicting swarm intelligence system, according to an embodiment of the disclosure.

FIG. 4 illustrates a schematic diagram depicting swarm intelligence system, according to an embodiment of the disclosure.

Referring to FIG. 4, the swarm intelligence system (SIS) 200 for smart devices may include at least one swarm intelligence system core engine 412 which may provide flexibility and customization capability by means of a plurality of configuration utilities for configuring the plurality of node configurations, access point, at least one algorithm containers, and the plurality of pluggable algorithms. The SIS 400 includes a plurality of SIS framework utilities providing shared libraries 422 for persistence, logging, XML based configuration, programmable I/O etc. The SIS 400 includes an engine agent 406 configured to provide message pipeline for notifications from the swarm intelligence system core engine 412. The SIS 400 includes a framework agent 410 which may provide a framework agent 410, for example, SIS REST SDK Server for handling REST API requests from the engine agent 406 and the SIS UI 408. The SIS UI 408 may monitor nodes' activities and simulate attack injection. The SIS 400 may include smart devices 402 which interact with a smart meter to read energy consumption data or a smart watch to read user activity data. The SIS 400 may further include pluggable algorithms such as swarm algorithm 420 for swarm detection and anomaly detector algorithms 404, the pluggable algorithms dynamically loaded for swarm detection and anomaly detection. The SIS 400 may further provide peer-to-peer Mesh Network 418 such as WiFi network which requires capability for communication among nodes in the swarm. The SIS 400 may include IoT Framework 414 such as IoT stack 416 configured for communication among nodes in the swarm.

Figure 5:
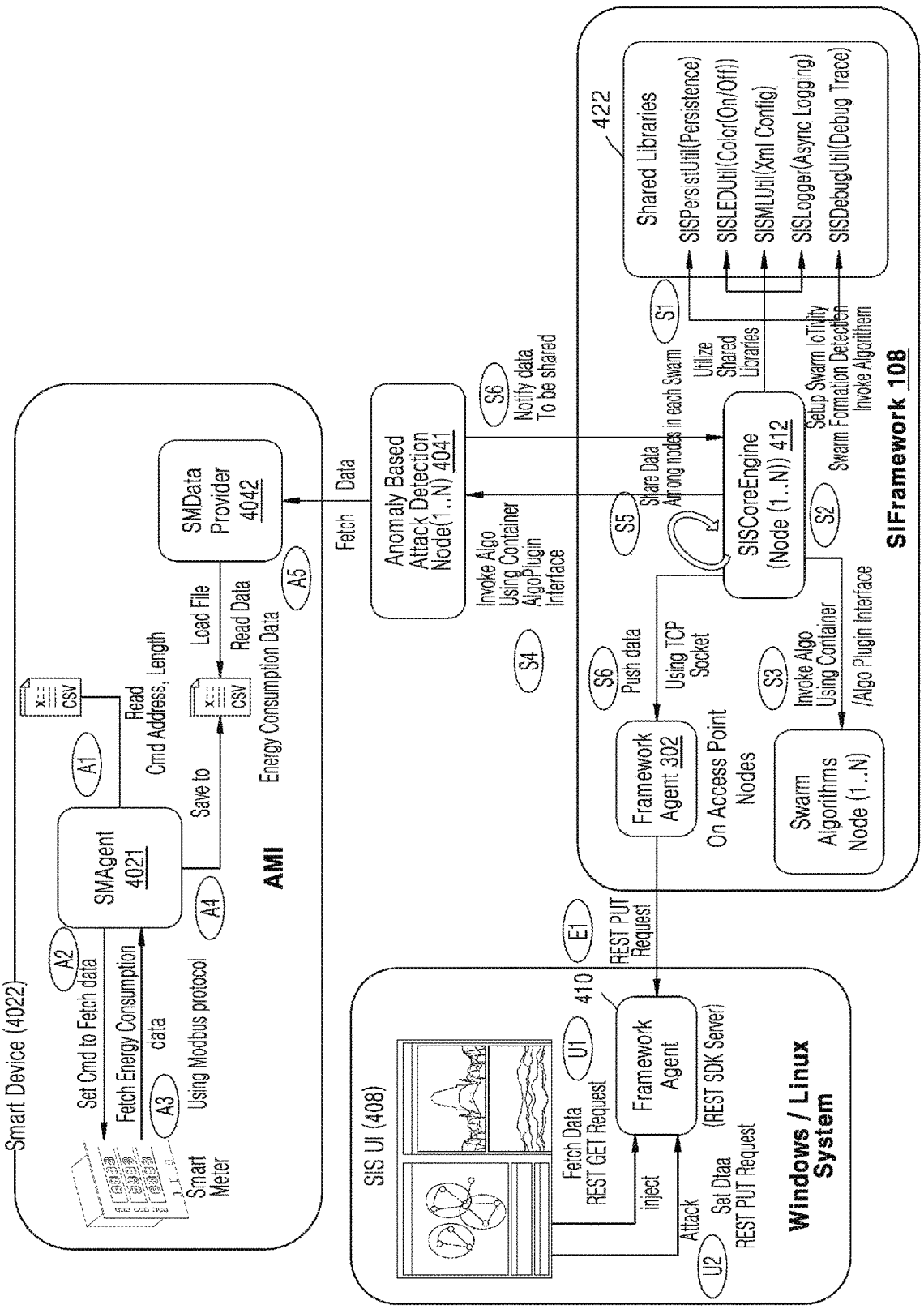
FIG. 5 illustrates a diagram of swarm intelligence system, according to an embodiment of the disclosure.

FIG. 5 illustrates a diagram of swarm intelligence system, according to an embodiment of the disclosure.

Figure 6:
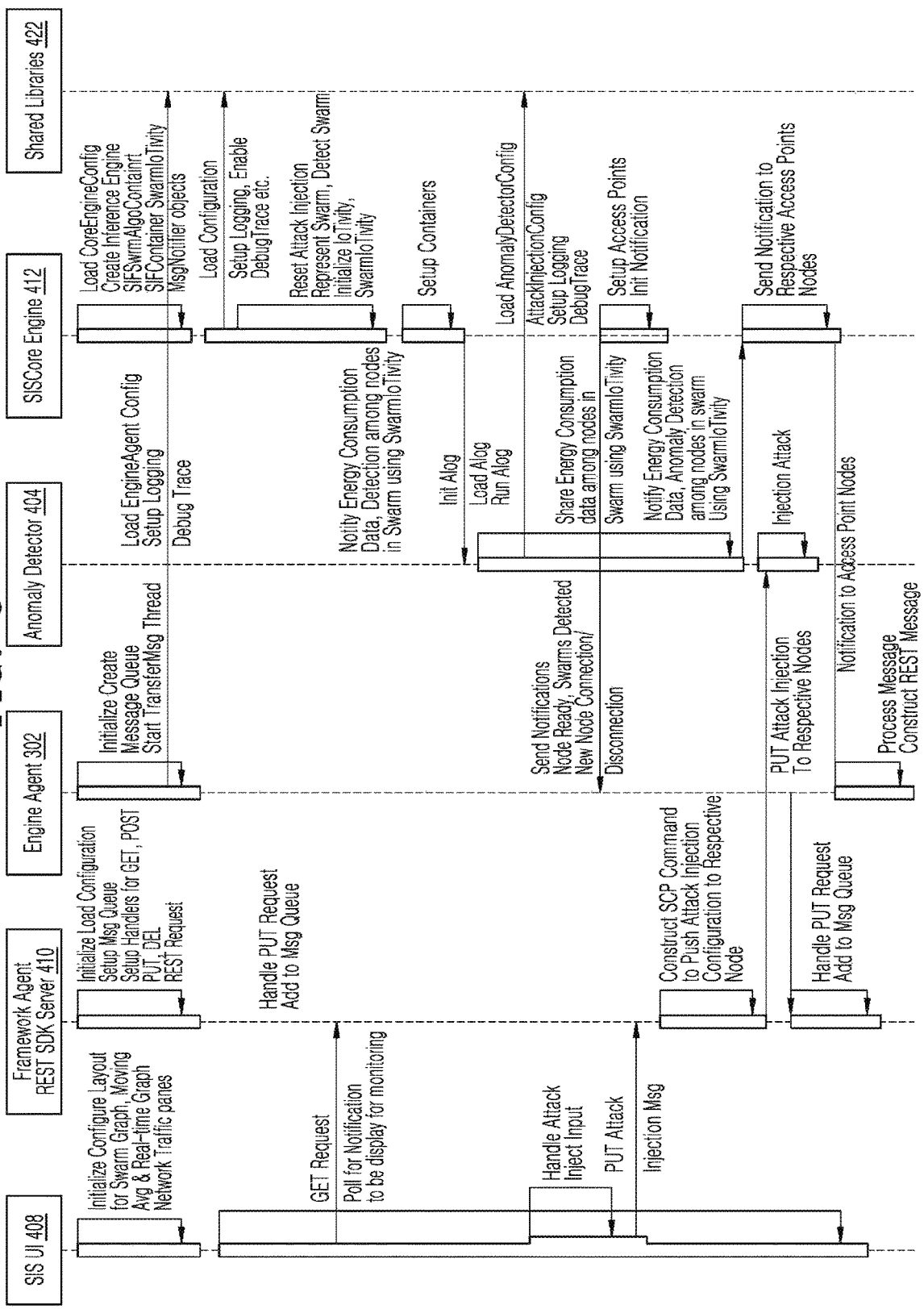
FIG. 6 illustrates an operational sequence of swarm intelligence system, according to an embodiment of the disclosure.

FIG. 6 illustrates an operational sequence flow of swarm intelligence system, according to an embodiment of the disclosure.

Referring to FIG. 5 and FIG. 6, the core engine configuration is loaded to initiate the SIS and the component of the SIS such as inference engine, SIF swarm algorithm container, SIF container, IoT framework, message notifier, and setup container. Further to initiating the SIS, the respective algorithms are loaded and executed by the SIS. Further to the execution of the respective algorithms, the algorithm may notify energy consumption data and perform a detection of swarms among the nodes in swarm using IoT Framework. Further, the notification data, node ready data and swarm detected data is processed to initialize configuration layout for swarm graph, moving average and real time graph, and network traffic panes. Further, the anomaly detector configuration, attack injection configuration, setup logging, and debug trace are loaded dynamically. Further to the dynamically loading the algorithms, energy consumption data is shared by the nodes in swarms using IoT framework and notifications data, node ready data, swarm detected data and node connection and disconnection data are sent to the core engine for processing. Further to the processing, SCP command to push attack injection is constructed and configured for the respective node to handle attacks.

In an embodiment of a smart device 402 such as Smart Meter 4023, FIG. 5 and FIG. 6 may be described by utilizing the SIS for Anomaly Based Attack detection in an Advanced Metering Infrastructure. The flow of events is described with the smart device 402 having a SM Agent 4021 which reads command address and length from command data 4022 which may be named as, for example, command.csv, in operation A1. In operation A2, the SM Agent 4021 sets command data 4022 to fetch data from the smart device 402 such as smart meter 4023. In operation A3, the SM Agent 4021 fetches energy consumption data from the smart meter 4023. Subsequently, the SM Agent 4021 saves the energy consumption data to a command.csv file. At this point, in the SI Framework 108, the SIS Core Engine 412 uses various shared libraries 422 in operation S1. Based on the operation S1, the SI Framework 108 directs the SIS Core Engine 412 to setup modules such as IoT Framework 414, Inference Engine 316, Swarm Representation, detection and creation modules. Accordingly, the SIS core Engine 412 invokes the algorithms in operation S2. In operation S3, the invoking of swarm algorithm using Container/Algo Plug-in Interface. In operation S4, the SIS Core Engine 412 invokes anomaly based algorithm for attack detection using an anomaly-based attack detection algorithm nodes 1, 2, 3, . . . , N) 4041. In an embodiment, the anomaly-based attack detection algorithm may be equivalent to the Anomaly Detector Algorithms 404. The anomaly-based attack detection algorithm nodes 4041, in operation A5, fetch data from the SMData Provider 4042. The fetched data may be smart meter data. Subsequently, the anomaly-based attack detection algorithm nodes 4041, notifies nodes of data to be shared among nodes in swarm in operation A6. Upon receiving such information, the SIS Core Engine 412, in operation S5, shares data among nodes in each swarm. In operation S6, the SIS Core Engine 412 pushes data to Engine Agent 302 using a TCP socket. In operation E1, the Engine Agent 302 makes a request—PUT request—to push data to Framework Agent 410 of SIS UI 408. In operation U1, upon receiving the data, the SIS UI 408 pulls data for displaying using GET REST request to the Framework Agent 410 (REST SDK Server). In operation U2, the SIS UI 408 makes PUT request to the Framework Agent 410 for attack injection.

Figure 7A:
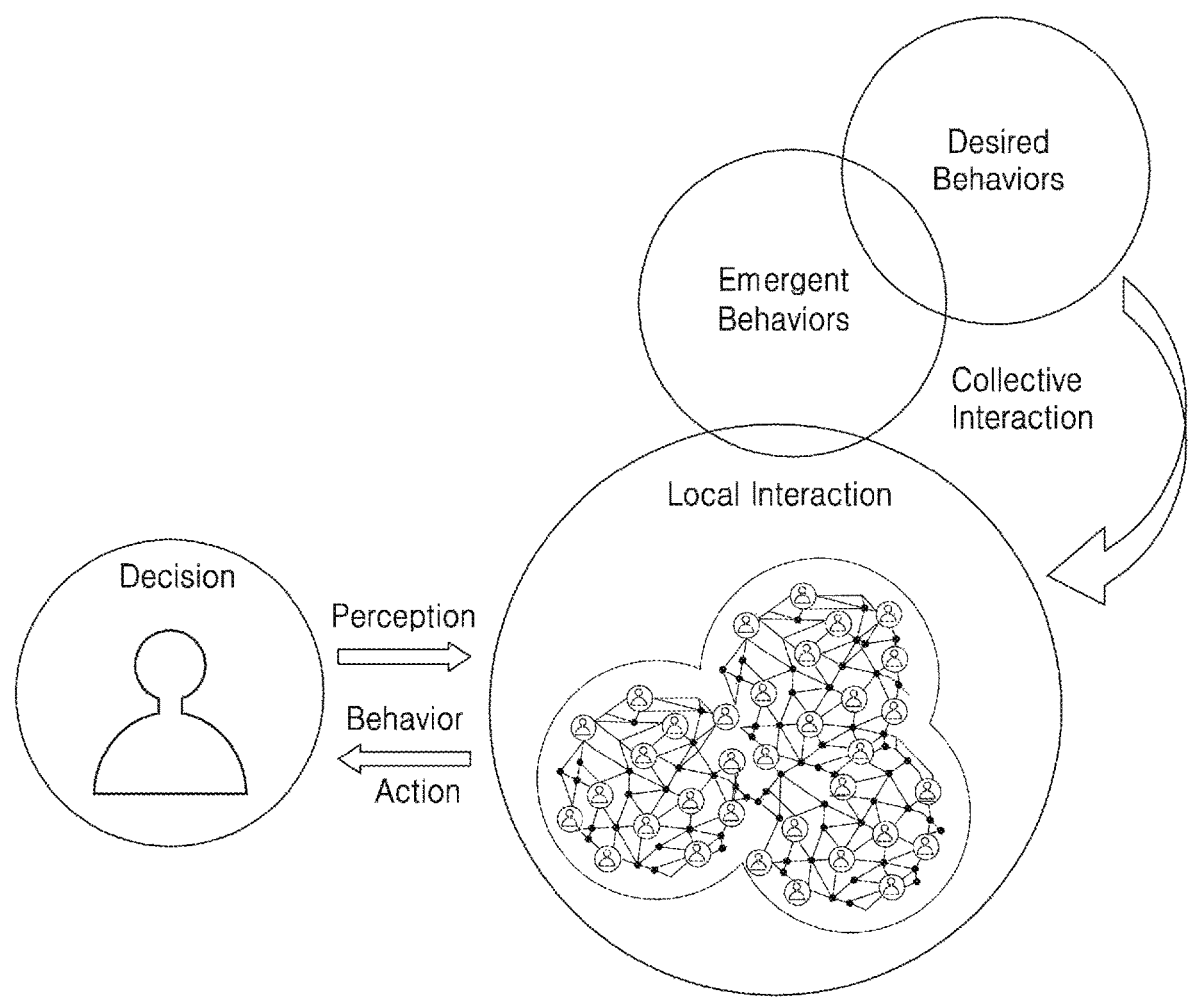
FIG. 7A illustrates a sequence diagram of swarm intelligence, according to an embodiment of the disclosure.

FIG. 7A illustrates a diagram of swarm intelligence, according to an embodiment of the disclosure.

Figure 7B:
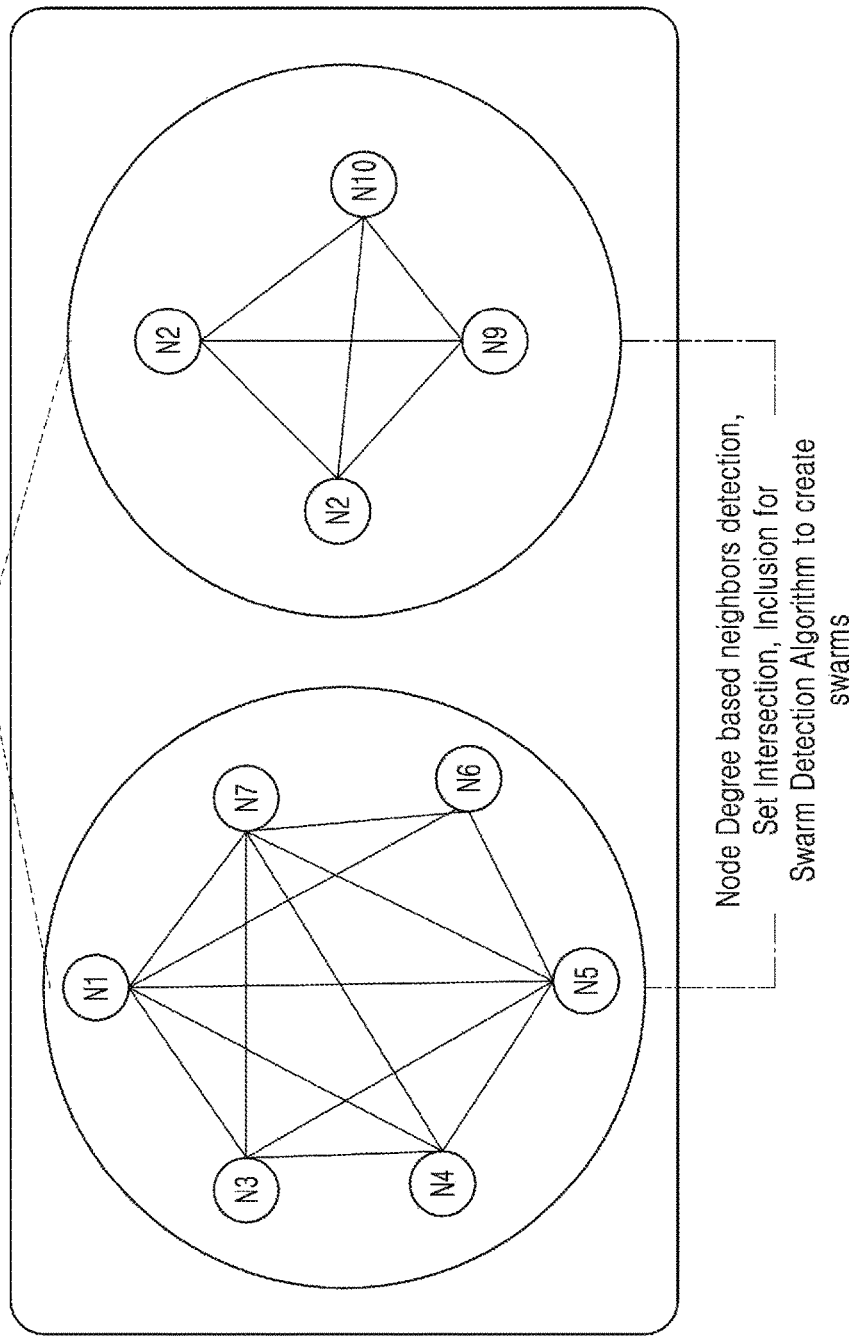
FIG. 7B illustrates an overview of swarm representation and detection in a swarm intelligence framework, according to an embodiment of the disclosure.

FIG. 7B illustrates an overview of swarm representation and detection in a swarm intelligence framework, according to an embodiment of the disclosure.

Figure 7C:
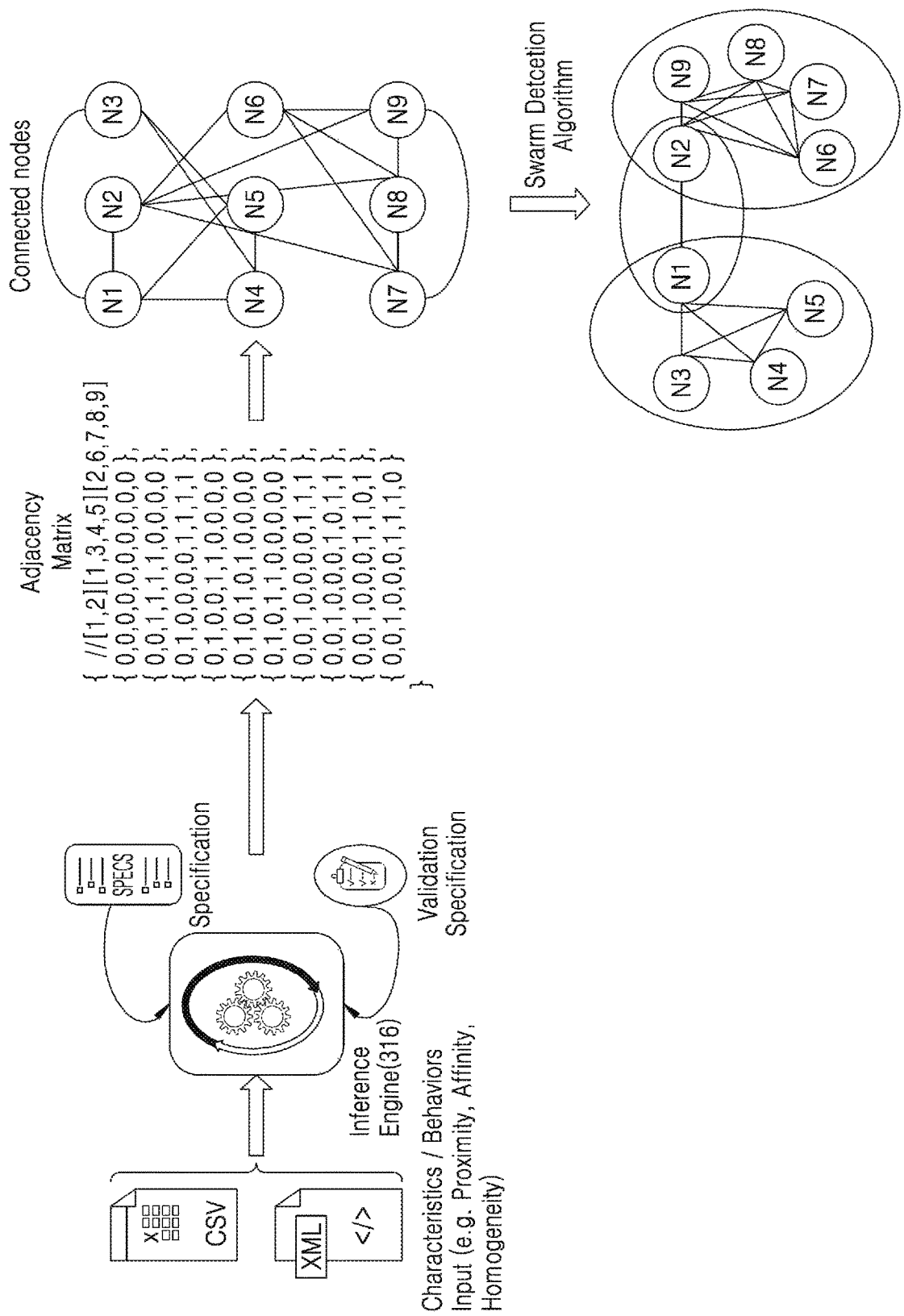
FIG. 7C illustrates an overview of generic swarm detection in a swarm intelligence framework, according to an embodiment of the disclosure.

FIG. 7C illustrates an overview of generic swarm detection in a swarm intelligence framework, according to an embodiment of the disclosure.

Referring to FIGS. 7A, 7B and 7C, the swarm detection algorithm uses the connectivity graph representing a network of nodes as input and using a node degree and set intersection and inclusion approach for detecting the swarms. The SI Framework loads dynamically the Swarm Detection algorithm using a container-based plug-in architecture to enable pluggable algorithms to be used for adapting and customizing the algorithms or logic for specific scenarios. Based on certain properties (for example, Wi-Fi strength of signals among nodes) and parameter, various swarms of nodes (for example, Smart TVs) are created based on common collective behavior. Thus, each node shares certain common property parameters and/or attributes parameters. In case swarms are similar type of device having similar behavior and/or properties in the network, the swarms are called homogenous swarms. For example, the swarms of smart TVs may behave similarly in the network or at least have similar properties to stream video content in the network. The smartTVs are homogenous swarms. Conversely, swarms of dissimilar devices connected by behavioral attributes of property may be called heterogeneous swarms.

The inference engine 316 analyzes this information and provides an adjacency matrix representing the connectivity of the SmartTVs in the network.

Referring to FIG. 7B, the inference engine 316 analyzes the input characteristics of the network of nodes in operation 711 and based on the given specification and the corresponding validation specification (thresholds) produces an adjacent matrix representing a construction graph of a network of nodes in operation 713. The input characteristics could be the node's behavioral input such as proximity of nodes (based on signal strength of Wi-Fi or Bluetooth), affinity of nodes, and/or homogeneity of nodes. In an embodiment, the input characteristics are defined and fed to the inference engine 316 in the form of simple CSV (Comma Separated Value) file or a more structured XML file describing the input characteristics. Once the network of nodes (devices in an IoT Environment) is represented as a graph—adjacency matrix. The Generic Swarm Detection algorithm is applied to arrive at the configuration of the swarms.

Figure 8:
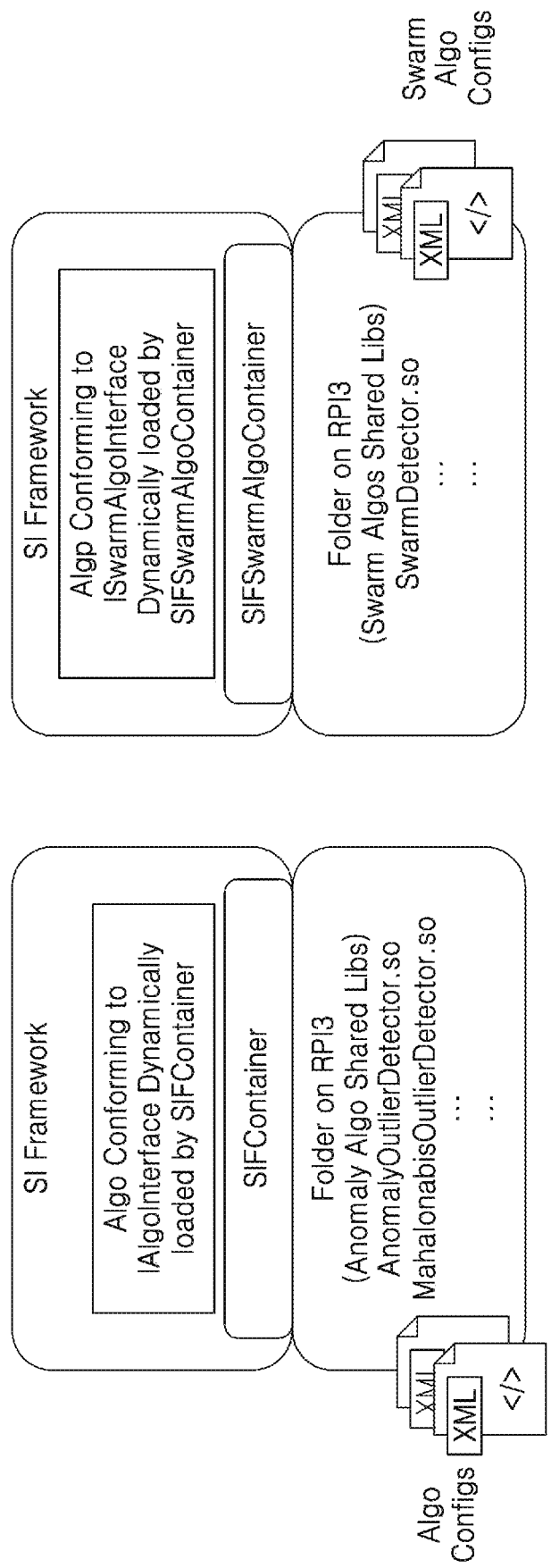
FIG. 8 illustrates an overview of container-based algorithm plug-in architecture, according to an embodiment of the disclosure.

FIG. 8 illustrates an overview of container-based algorithm plug-in architecture, according to an embodiment of the disclosure.

Figure 9:
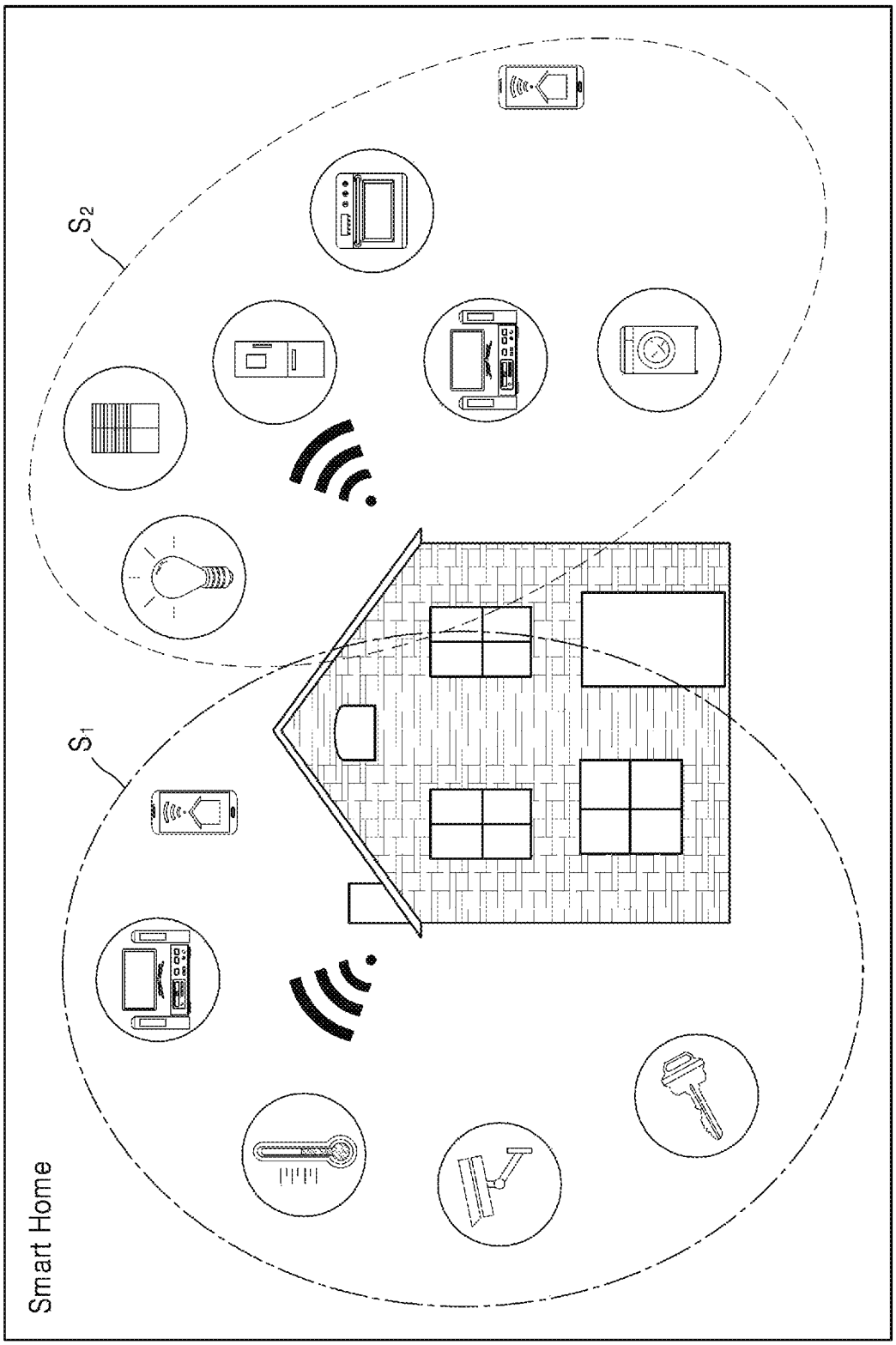
FIG. 9 illustrates a use-case of swarm intelligence framework for home automation, according to an embodiment of the disclosure.

Referring to FIG. 8, the Algorithm Plug-in Architecture consists of a well-defined algorithm Interface which every pluggable algorithm needs to implement to conform to and be able to be loaded and used by the SI Framework. Further, the algorithm container in the Swarm Intelligence Framework analyzes the configuration utilities to extract the path of the shared library to load the shared algorithm library. The shared library is dynamically loaded (binary level reuse) without the need to recompile the Swarm Intelligence Framework components. Once the shared library is dynamically loaded, the logic within the shared library determines the final outcome FIG. 9 illustrates a use-case of swarm intelligence framework for home automation, according to an embodiment of the disclosure. The nature of communication and the frequency of communication which form the characteristics for determining a swarm.

Referring to FIG. 9, there will be more updates from temperature sensors, an air conditioner, a surveillance camera to the Smart TV than from a refrigerator or the washing machine, or smart window blinds to the Smart TV. This could be one of the aspects on which devices are added as part of one swarm $S_1$ while the rest of the devices which are more passive on updates are a part of another swarm $S_2$. The Smart TV or a mobile device would be a part of all swarms as they act as the primary interface for a home user to sense and control the smart devices. This is just one set of characteristics on which the swarm representation, detection is based on. There can be other characteristics to be considered like all environment controlling devices such as centralized AC, Air Control, Temperature sensor, water heater, humidifier, and the like are grouped into one swarm while other smart devices like close circuit camera (Monitoring), Smart Alarm, Smart Media, Smart Lighting, or the like are grouped into another swarm. Having this form of grouping of swarm is important to effectively and efficiently control, update, and monitor these devices as well as secure these devices. Hence, there is a need for representation of swarm of devices and also detection of the swarm based on the input or system characteristics. The inference engine 312 processes the input and system characteristics and generates a connectivity graph of the devices represented as an adjacency matrix. Then a generic swarm detection algorithm is applied to detect the swarms. The swarm detection algorithm may be a pluggable algorithm that is plugged in using the container-based Algorithm Plug-in Architecture.

Figure 10:
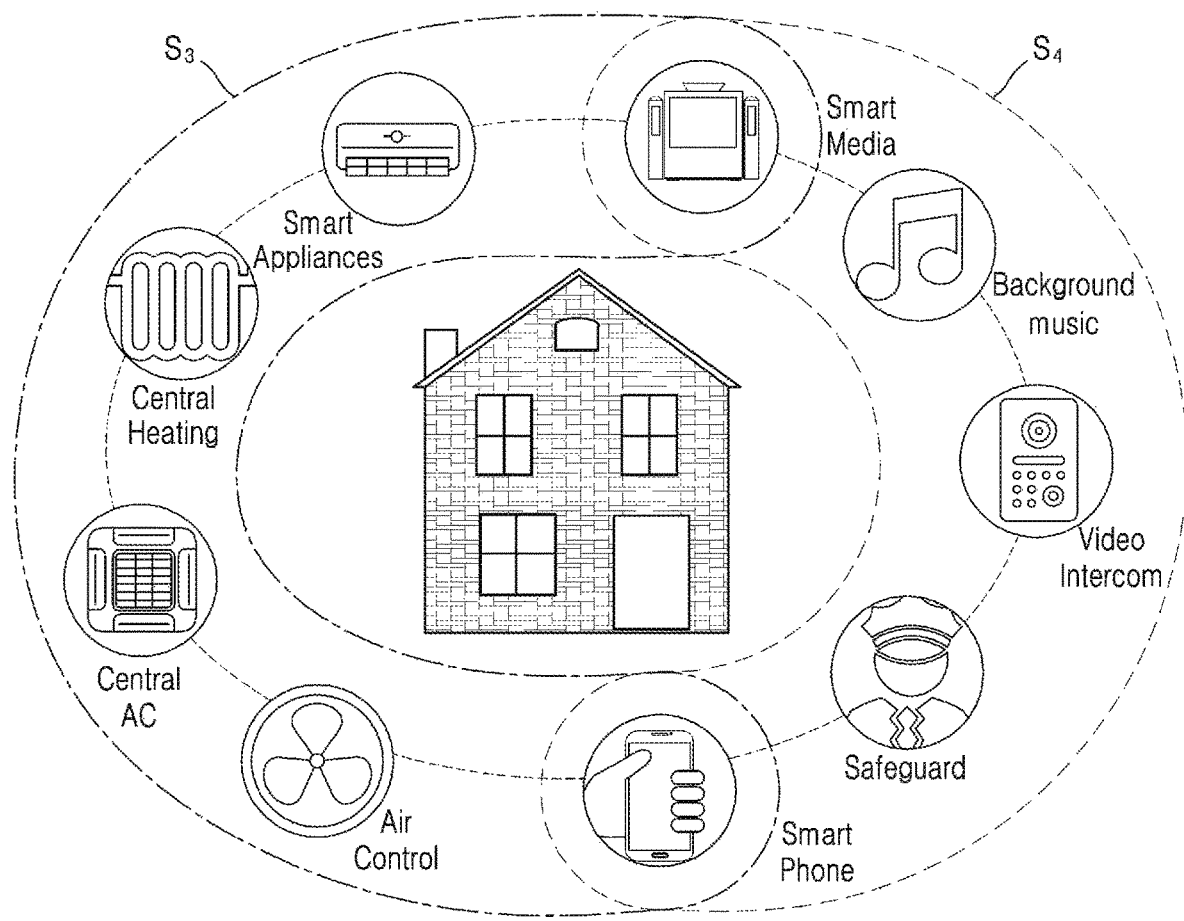
FIG. 10 illustrates a use-case of anomaly detection for securing smart home, according to an embodiment of the disclosure.

FIG. 10 illustrates a use-case of anomaly detection for securing smart home, according to an embodiment of the disclosure.

Referring to FIG. 10, the parameters related to nature of communication and/or frequency of communication form the characteristics for determining a swarm such as $S_3$ or $S_4$. The inference engine 312 processes the input and/or system characteristics and generates a connectivity graph of the devices represented as an adjacency matrix. Then, a generic swarm detection algorithm is applied to detect the swarms. The swarm detection algorithm itself is a pluggable algorithm that is plugged in using the container-based Algorithm Plug-in Architecture. Once there are swarms of devices identified and defined, the functioning of these devices could be monitored by its neighboring devices themselves and using Swarm Intelligence. Any Anomalies in functioning of the devices are detected based on anomaly detection algorithms that are customized to specific scenario. Anomaly detection is performed by the neighboring devices that are a part of the swarm based on a distributed consensus algorithm that can detect anomalies or attacks in the home network of smart devices. The implementation of these requires algorithms that can be dynamically plugged in and used using the container-based Algorithm Plug-in Architecture which is provided by the SI Framework.

Figure 11:
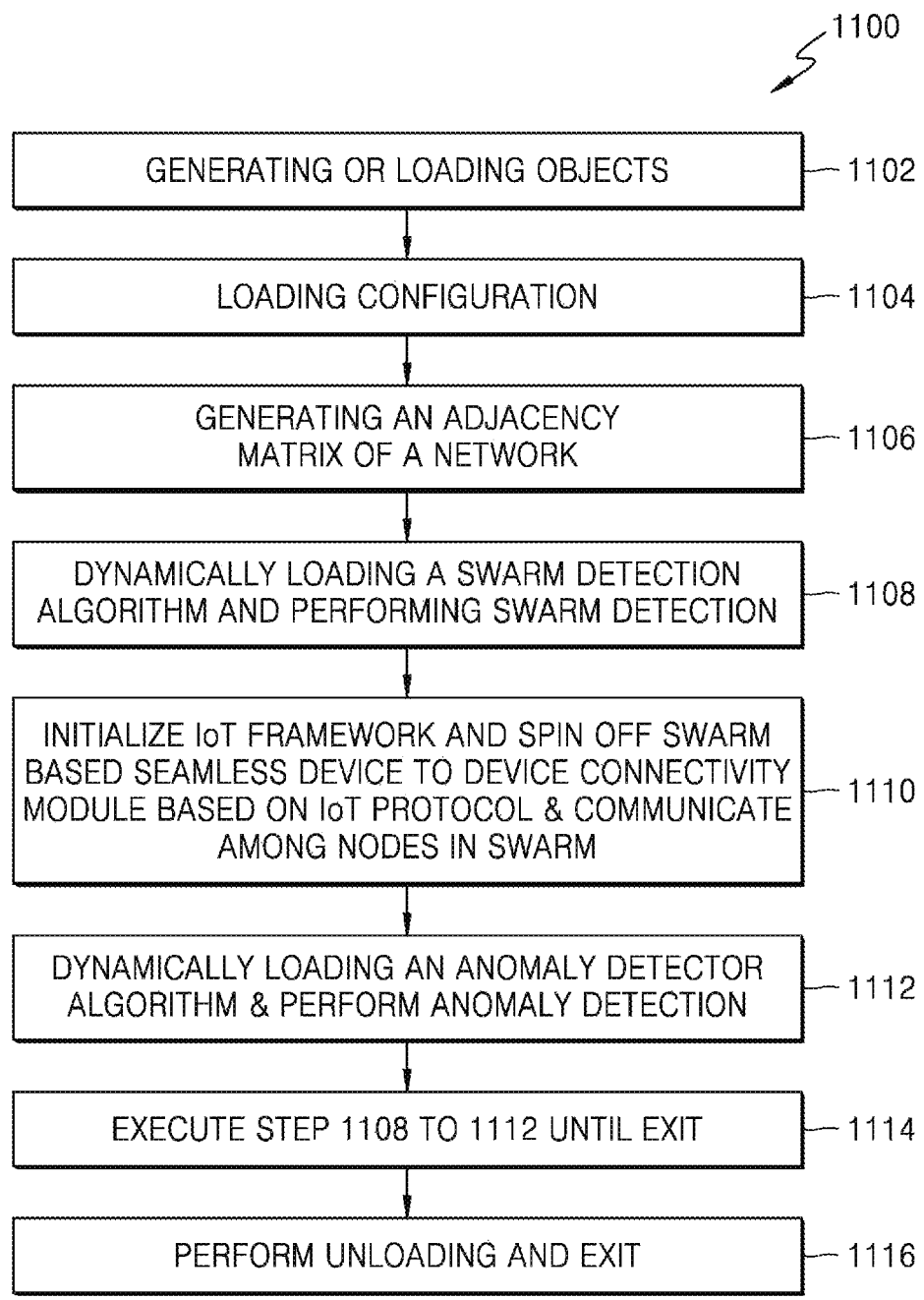
FIG. 11 illustrates a flowchart for organization and detection of swarms and application of swarm intelligence using swarm intelligence network, according to an embodiment of the disclosure.

FIG. 11 illustrates a flowchart 1100 for organization and detection of swarms and application of swarm intelligence using swarm intelligence network, according to an embodiment of the disclosure.

Referring to FIG. 11, the method includes generating or loading all required objects such as an inference engine, an SIF swarm algorithm container, an SIF container, an IoT framework, a message notifier, and a setup interrupt handler in operation 1102. In operation 1104, the SIS core engine loads configurations using configuration utilities such as xml utilities and spin off node connection and/or disconnection process. In operation 1106, the inference engine loads configurations using configuration utilities such as XML utilities, processes network characteristics inputs and generates an adjacency matrix of a network of nodes. In operation 1108, the SIF swarm algorithm container dynamically loads swarm detection algorithm and performs swarm detection. The SIF swarm algorithm container may notify detected swarms to a monitoring unit and may repeat the detection of swarms in case of nodes connections and/or disconnections. In operation 1110, the IoT Stack and spin off IoT Framework is initialized on a thread (first time) and data is continuously shared among nodes in swarm using pub/sub pattern. In operation 1112, the SIF container dynamically loads anomaly detector algorithm and performs anomaly detection using consensus algorithm, notifies or transmitting the detection status to the SIF and identification of the anomalous nodes. In operation 1114, the detection process operations of 1108 to 1112 are repeated till an interrupt trigger is detected or an exit. In operation 1116, all the required objects are unloaded.

Figure 12:
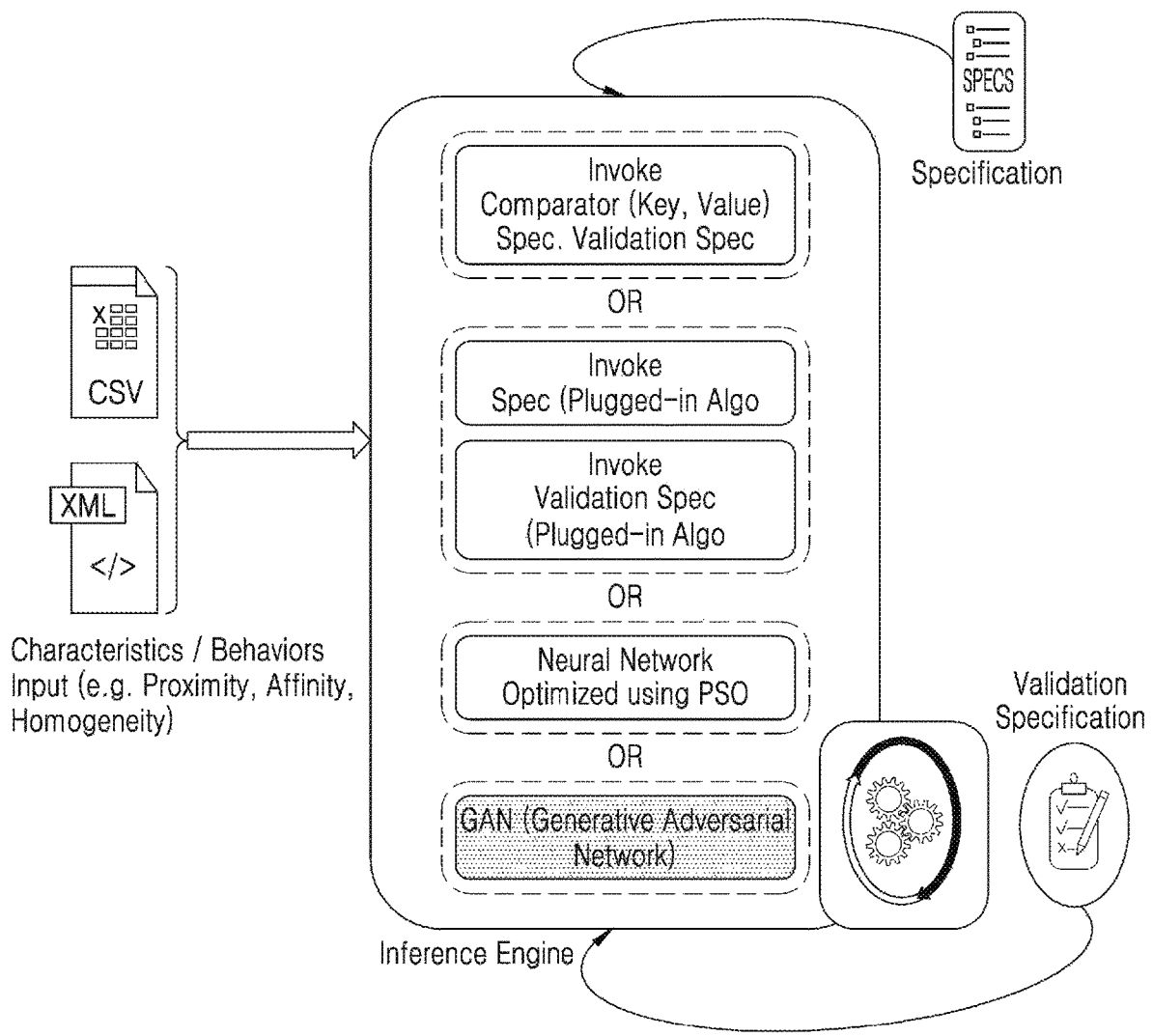
FIG. 12 is a schematic diagram illustrating inference engine of swarm intelligence framework, according to an embodiment of the disclosure.

FIG. 12 is a schematic diagram illustrating inference engine of swarm intelligence framework, according to an embodiment of the disclosure.

Referring to FIG. 12, the processing in the inference engine could be very simple as comparing a set of key and value pairs (spec) against the thresholds (validation spec). This can be more complex in case multi-dimensional parameters are to be considered and processed, in which case the inference engine first transforms the input characteristics in a form that can be represented and processed as a neural network. The Particle Swarm Optimization (PSO) is used for quick convergence to maximize or minimize the weights of the neural network based on the input specification (objective function). The validation specification is used to determine if the resultant output is within the thresholds thus forming an adjacency matrix representing connection of nodes in the network. There may be other scenarios which require a set of parameters to decide on the connectivity of the nodes based on the input characteristics. This logic itself can be implemented in a separate binary and dynamically loaded using container-based Algorithm Plug-in Architecture which provides the specification and the validation specification against which characteristics needs to be validated. This ensures that this inference engine is adaptable, customizable and reusable for various scenarios and use cases.

Figure 13:
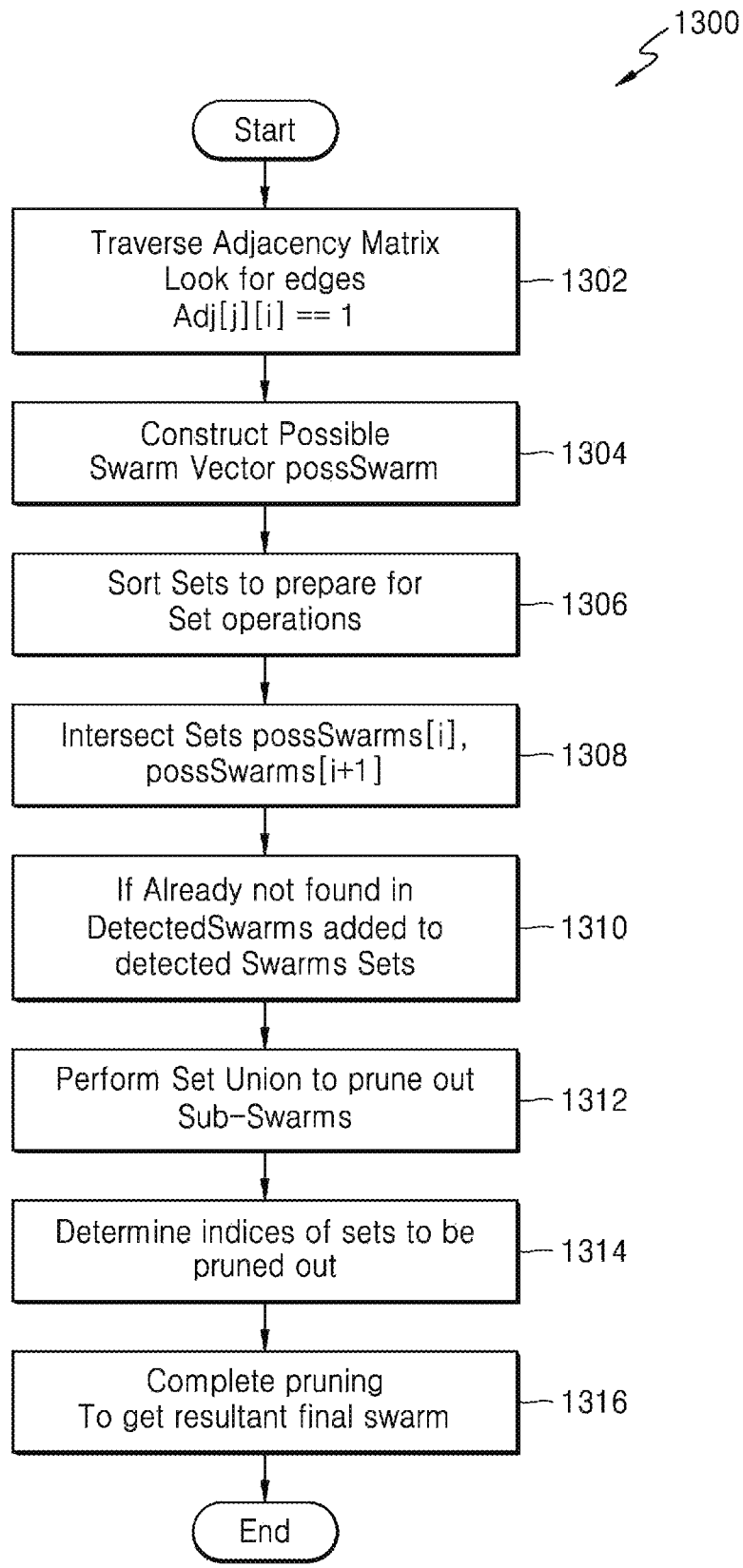
FIG. 13 illustrates a flowchart of a swarm detection process, according to an embodiment of the disclosure.

FIG. 13 illustrates a flowchart 1300 of a swarm detection process, according to an embodiment of the disclosure.

Referring to FIG. 13, In operation 1302, the method may include traversing an adjacency matrix by using characteristics such as node degree of each node to determine the edges. In operation 1304, the method may include building a list of elements that are potential candidates of a swarm by constructing possible swarms vector posSwarm. In operation 1306, the sets are sorted to prepare for set operations. In operation 1308, by comparing each element iteratively, each element in the possible swarms vector and intersect with the next to determine the possible swarms containing two or more nodes when the value of i==1 is satisfied. In operation 1310, if a swarm is not found in already detected swarms, the detected swarm is added to detected swarm sets. In operation 1312, the method may include performing a set union to prune out sub-swarms. In operation 1314, the method may include determining indices of sets to be pruned out. In operation 1316, the method may include completing the pruning to get resultant final swarm.

Figure 14:
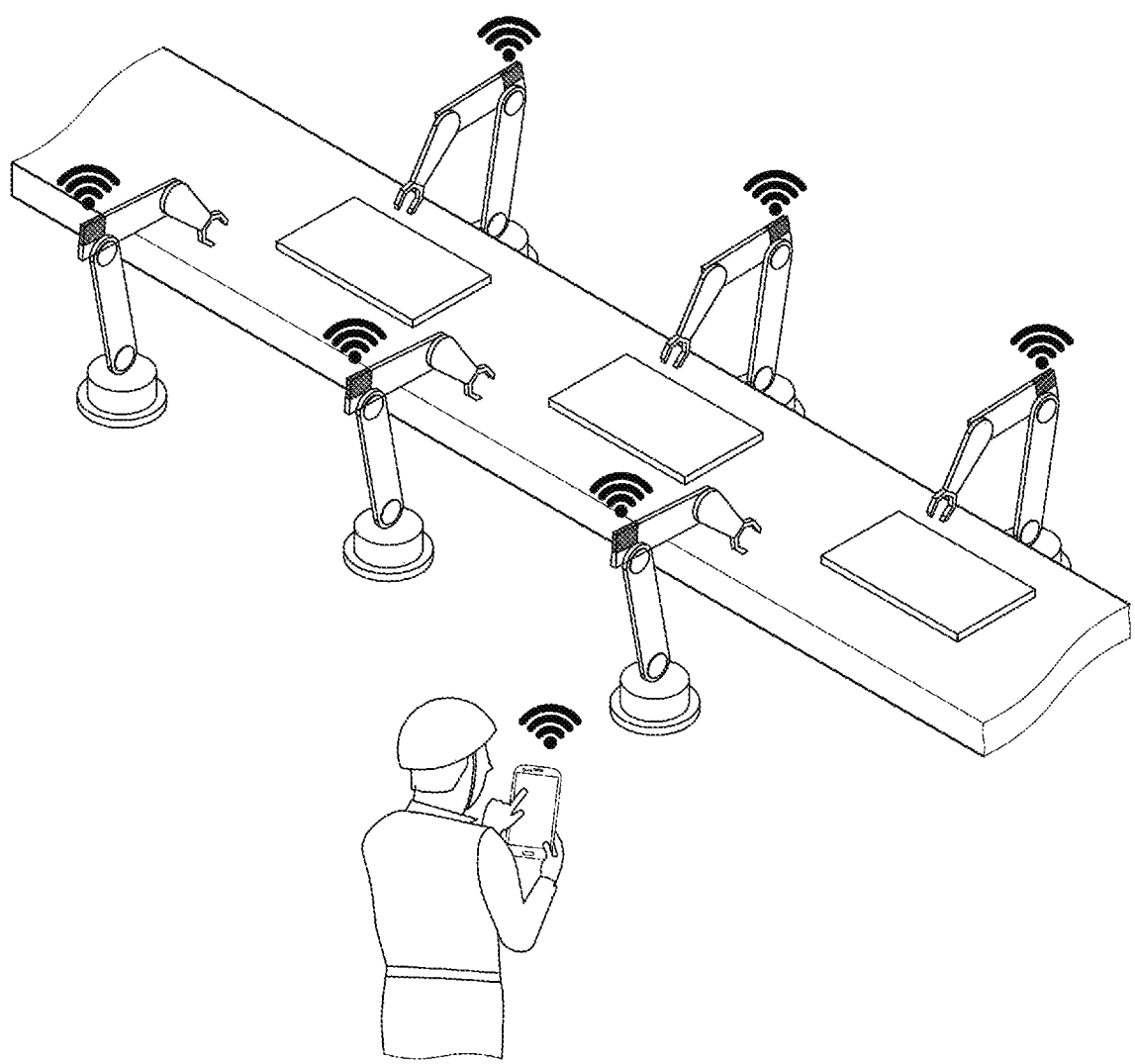
FIG. 14 is a use-case illustrating a reconfiguration of robots in assembly line, according to an embodiment of the disclosure.

FIG. 14 is a use-case illustrating a reconfiguration of robots in assembly line, according to an embodiment of the disclosure.

Referring to FIG. 14, once one of the robots in the assembly line is re-configured, the configuration can be updated to all the robots using Wi-Fi connectivity and integrity of updates to entire set of robots can also be validated using the consensus based logic implemented using swarm intelligence.

Figure 15:
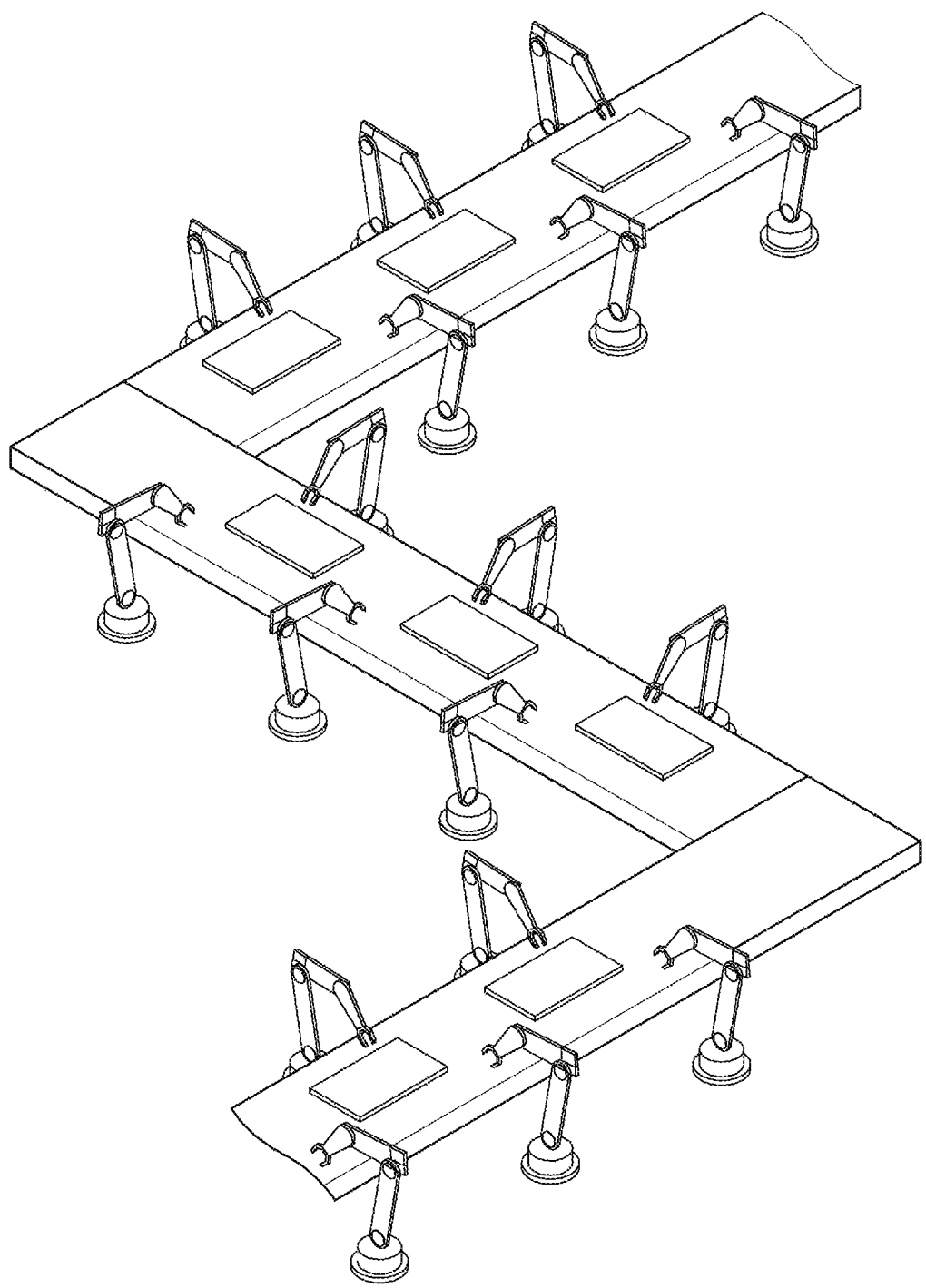
FIG. 15 is another use-case illustrating a reconfiguration of robots in mobile assembly line, according to an embodiment of the disclosure.

FIG. 15 is another use-case illustrating a reconfiguration of robots in mobile assembly line, according to an embodiment of the disclosure.

Referring to FIG. 15, swarm intelligence algorithms such as ACO, PSO are used to arrive at better routing and scheduling strategies which will optimize the production time, cost and also reconfigure and update robotic infrastructure more easily using swarm intelligence as this is run right on the edge as part of the devices or near the devices.

In an embodiment, a factory environment having a huge set of devices such as automated robotic welding arms (tools) which would require to be re-configured when the production plan changes. Again, swarm intelligence is applied to autonomously perform the re-configuration of all the devices once one particular device is updated. This enables the system to be self-healing in case of an occurrence of faults in configuration.

Figure 16:
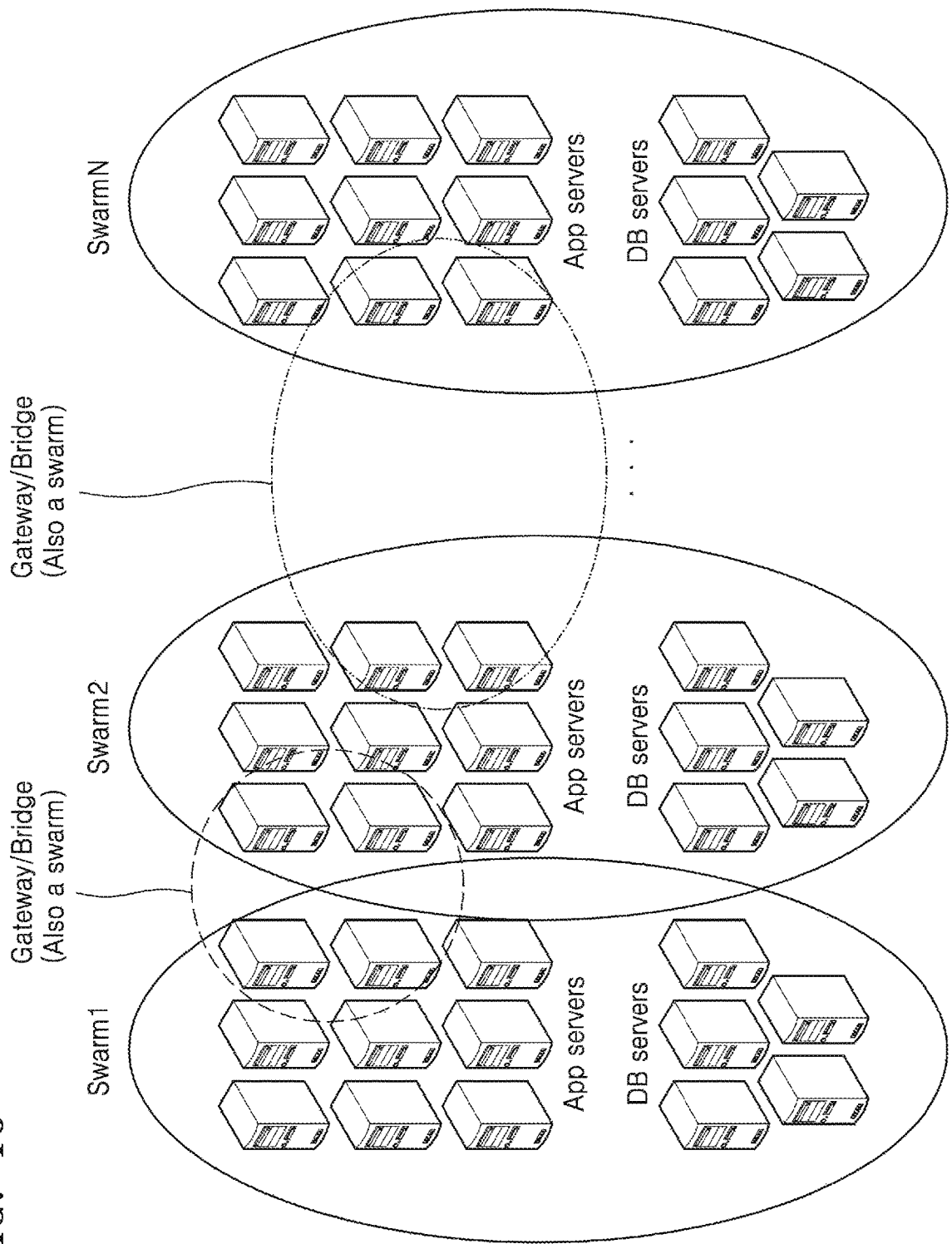
FIG. 16 is a use-case illustrating server-pools clustering, according to an embodiment of the disclosure.

FIG. 16 is a use-case illustrating server-pools clustering, according to an embodiment of the disclosure.

Referring to FIG. 16, there are many scenarios such as the nature of the workload, proximity of the users of the data or content, and/or frequency of updates which are the characteristics based on which the pool of systems (or virtual machines) are clustered together and/or operated as a cluster. The Swarm Intelligence is used to download the required updates locally onto one of the systems in the network and autonomously perform the updates locally. This saves a lot of network bandwidth and time. Also, the configuration of the network—both physical or VPN network—might vary vastly. Initially, there could be gateways or bridges used to synchronize one or a few systems in other swarms. Note that using Swarm Intelligence, rest of the systems in the cluster is updated which is more efficient in term of saving network bandwidth, speed etc. The swarm detection algorithm contributes to identify and define swarms with the multi-dimensional input characteristics that are processed by the inference engine and transformed into a graph of nodes (Adjacency Matrix) based on which the swarms are detected using the generic swarm detection algorithm.

Figure 17:
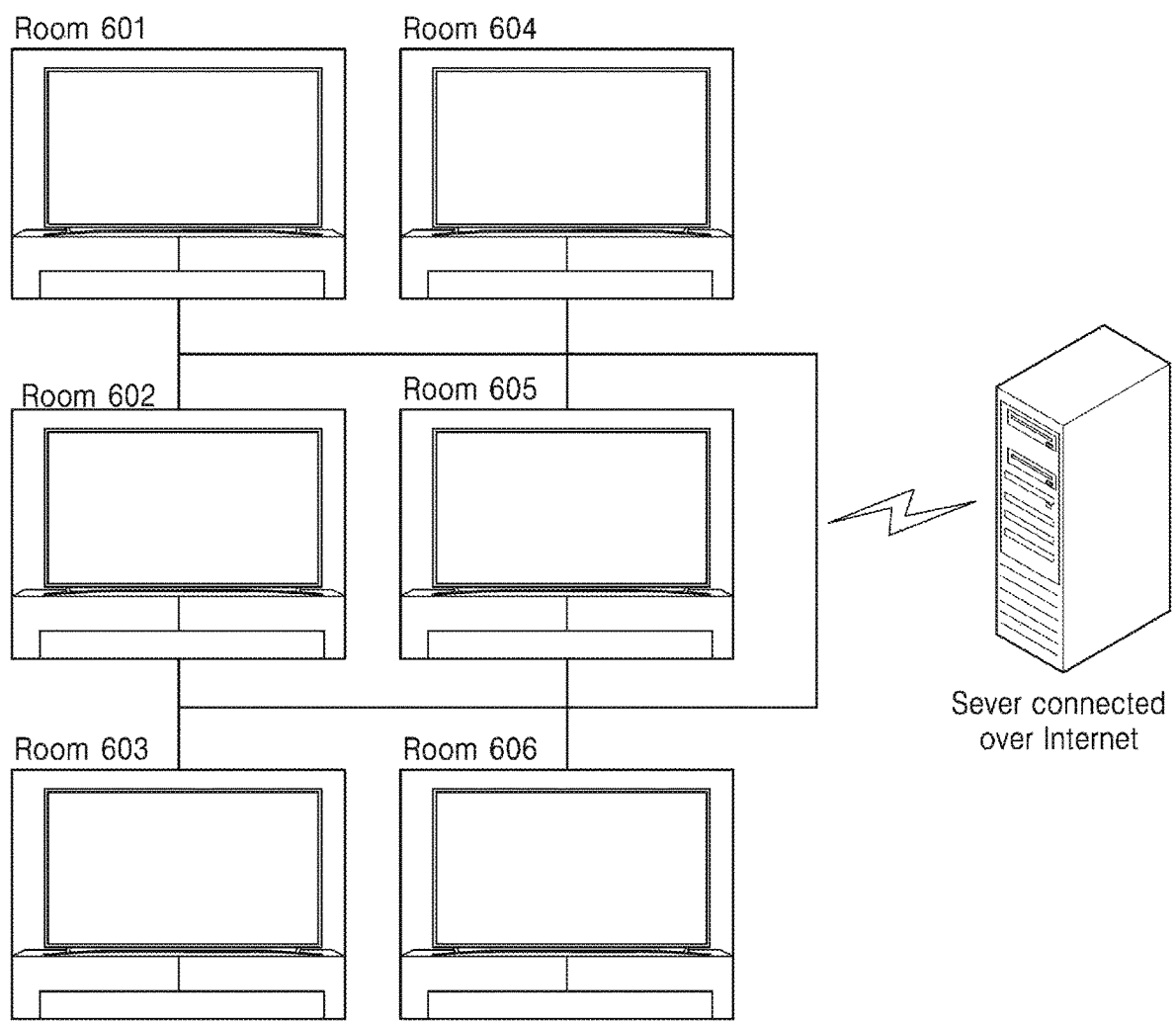
FIG. 17 is a use-case illustrating a hotel TV network with smartTVs, according to an embodiment of the disclosure.

FIG. 17 is a use-case illustrating a hotel TV network with smartTVs, according to an embodiment of the disclosure.

Figure 18:
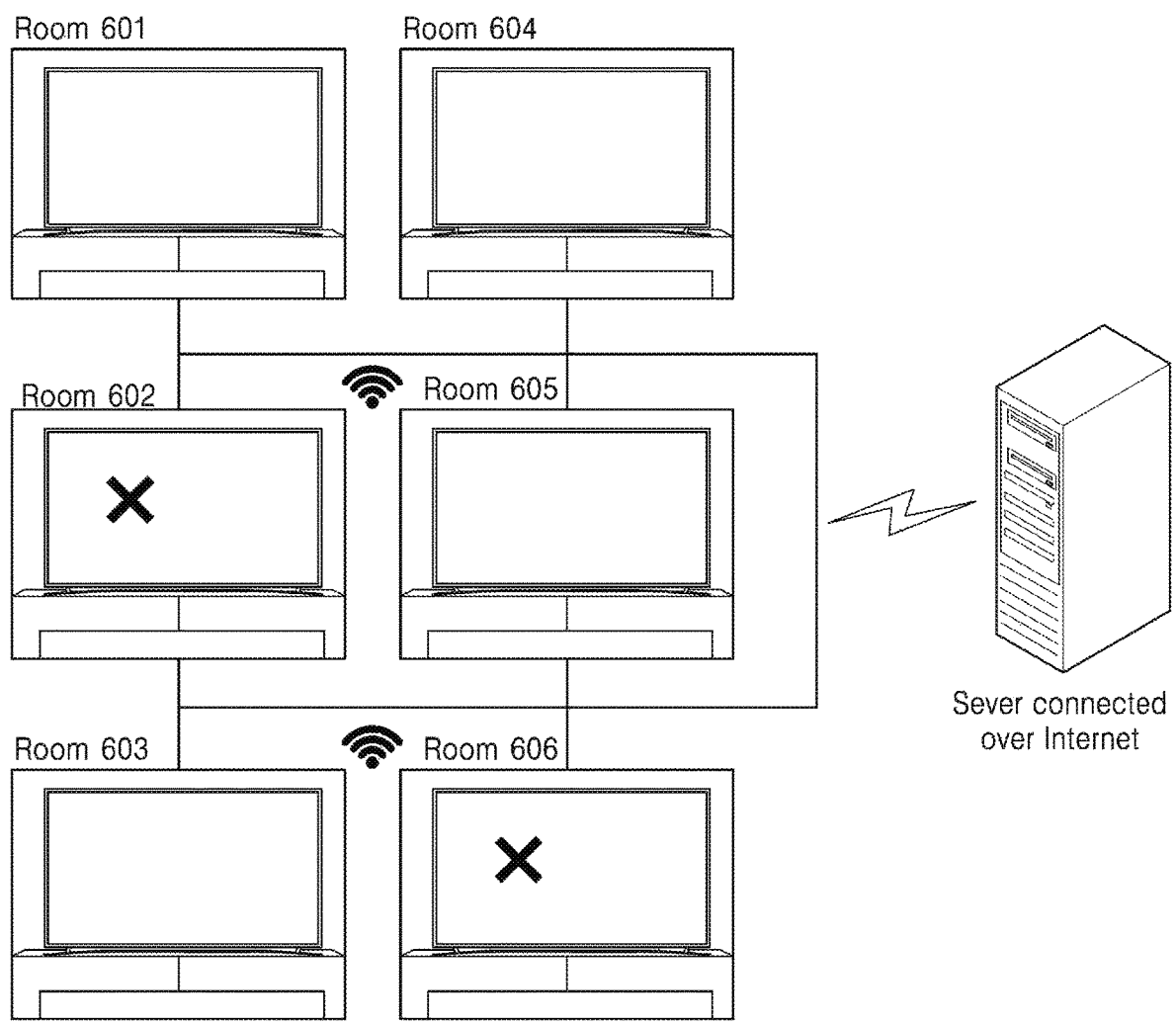
FIG. 18 is a use-case illustrating a swarm intelligence applied to synchronize content, according to an embodiment of the disclosure.

FIG. 18 is a use-case illustrating a swarm intelligence applied to synchronize contents, according to an embodiment of the disclosure.

Referring to FIGS. 17 and 18, the swarm of network of SmartTVs which are grouped based on the proximity therebetween is formed by the automatic swarm detection algorithm. If updates are successfully completed on one of the initiator nodes (SmartTV), the rest of the SmartTVs in the swarm network are locally updated saving a lot of network bandwidth and time. In the above scenario, if there are anomalies with respect to the normal functionality of the devices as determined by the pluggable Anomaly Detection algorithm that is customized to the specific use case or scenario, the devices such as Room 602 and Room 606 could be flagged as anomalous and taken out for rotation and update. The Algorithm Plug-in Architecture provides a solution to these scenarios where the Swarm Intelligence Framework (SIF) is adopted with required customizations implemented as part of the pluggable algorithm binaries.

Figure 19:
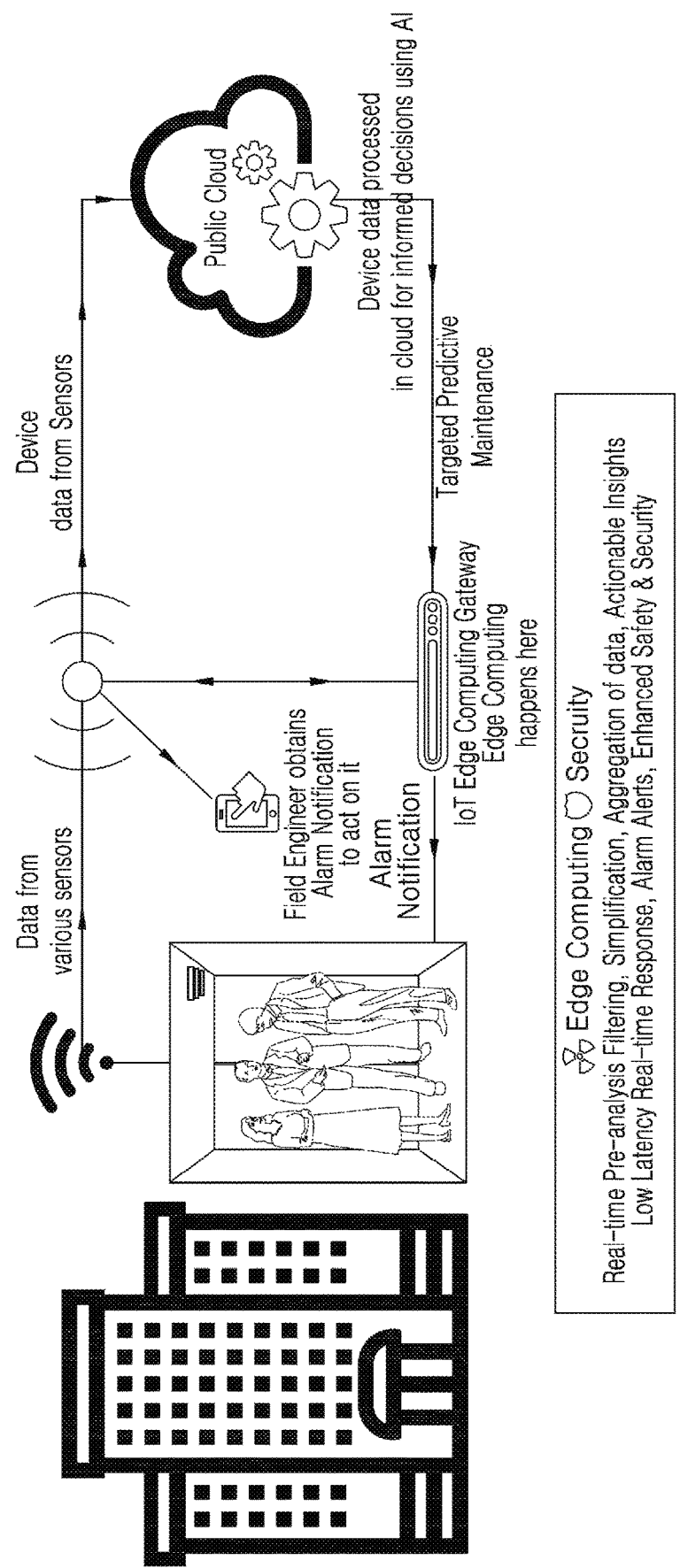
FIG. 19 is a use-case illustrating a smart building with smart elevators, according to an embodiment of the disclosure.

FIG. 19 is a use-case illustrating a smart building with smart elevators, according to an embodiment of the disclosure.

Referring to FIG. 19, the smart elevator solution requires the representation, detection and creation of swarms of connected devices (sensors) and will also require a container-based algorithm plug-in architecture to plug-in algorithms to detect anomalies in functioning of the smart elevators. Hence swam intelligence system is adopted. This forms the input for the generic swarm detection algorithm.

Swarm representation and creation are important steps for applying Swarm Intelligence for solving specific types of problems. The swarm size—the number of nodes, swarm structure—connectivity of nodes would require to be different to effectively and efficiently apply swarm intelligence for specific scenarios. For example, the swarms to be represented or created for AMI—Smart Metering attack detection would be different from swarms to be represented or created for Smart Automation of digital appliances in Smart Home or swarms of drones used in Land Surveillance or from the swarms for reconfiguration of Smart tools scenarios as this is defined and dependent on the system or environment characteristics. Because the organization of entities involved—nodes in Swarm—is different for each scenario in the real world and also scales differently as well as it grows or scales organically in the real world. Also, the nature of the swarm is dependent on the characteristics of the nodes and their connectivity. For example, considering the scenario of Smart Metering in a Smart Building, the connectivity (strength of signal) of nodes (Smart Meters) in a Mesh Network (WiFi or Bluetooth) could be considered as one of the characteristics that define the swarm. As an example, the connectivity among nodes in the peer-to-peer WiFi (or Bluetooth) Mesh network is obtained from the WiFi (or Bluetooth) signal strength matrix (routing table) using B.A.T.M.A.N control of the B.A.T.M.A.N protocol implementation. This forms the input for the inference engine. There could be several other input characteristics which need to be considered to arrive at organization of the swarm for a particular scenario. The inference engine processes and analyzes the input characteristics and provides a connectivity graph (adjacency matrix) as an output.

Figure 20:
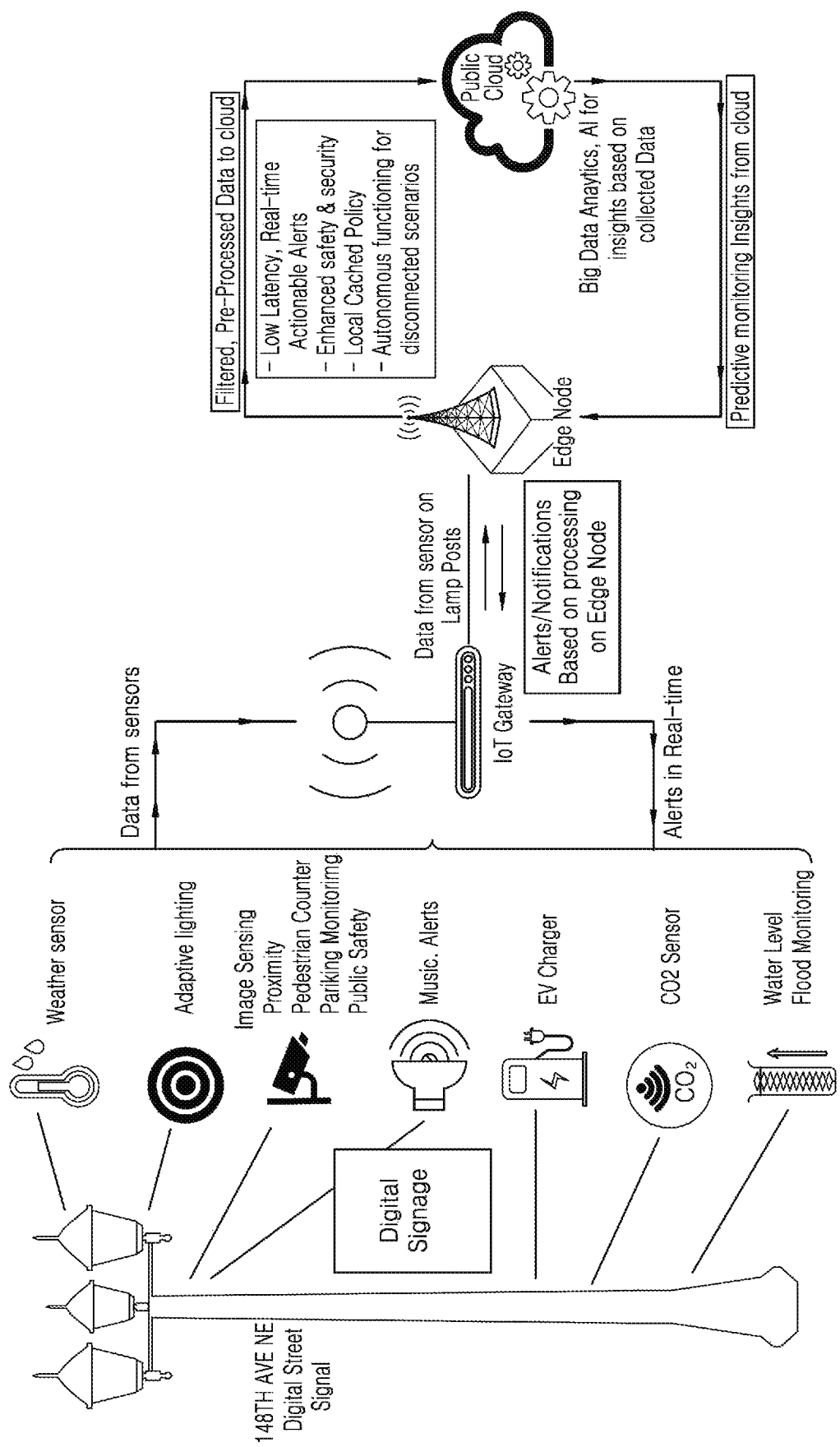
FIG. 20 is a use-case illustrating a smart lighting, according to an embodiment of the disclosure.

FIG. 20 is a use-case illustrating a smart lighting, according to an embodiment of the disclosure.

Referring to FIG. 20, this requires representation, detection of swarms and also the use of container-based plug-in architecture to realize these scenarios by using specific pluggable algorithms and/or logic to suit these scenarios.

Figure 21:
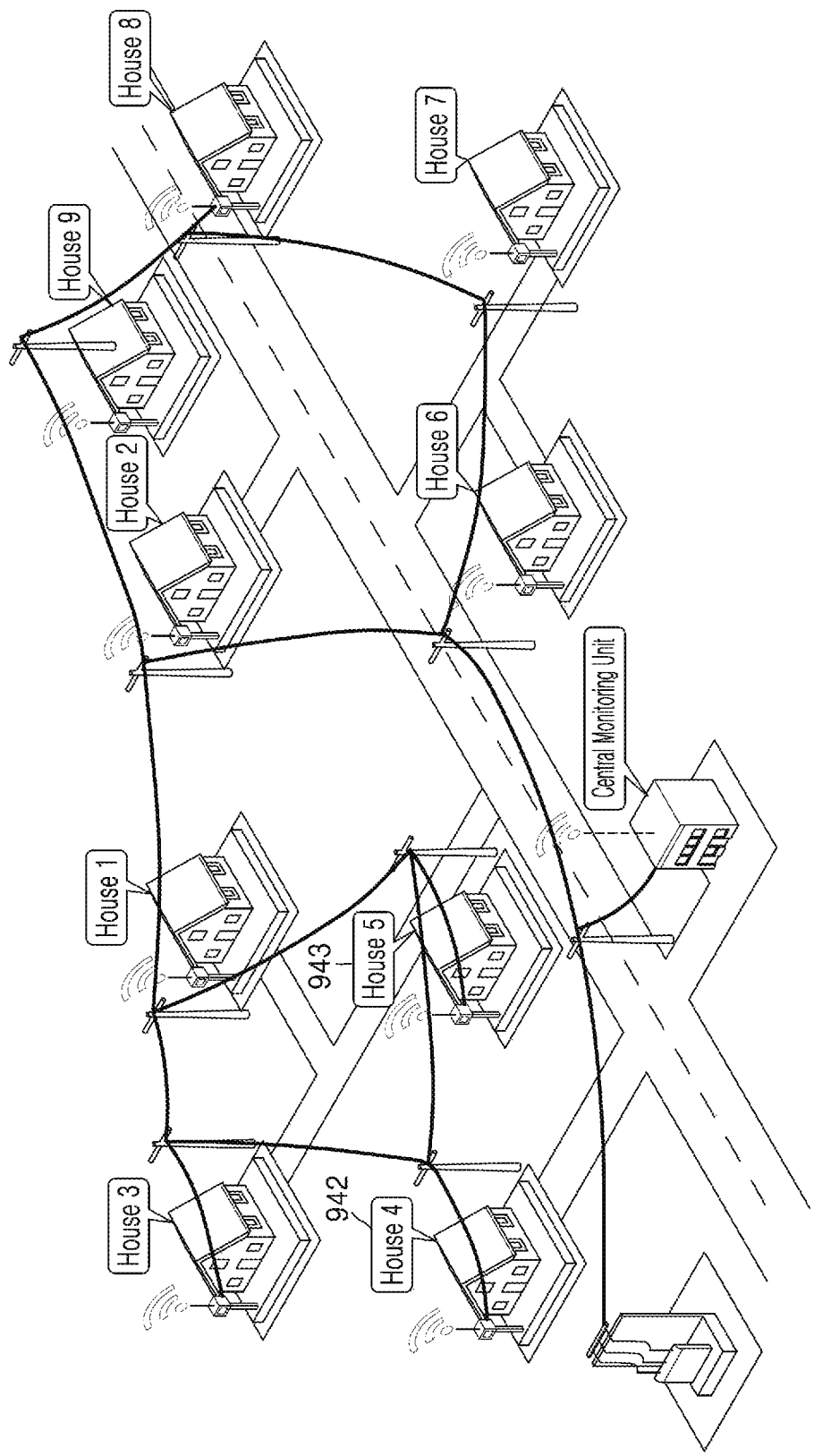
FIG. 21 illustrates a use-case illustrating an advanced metering infrastructure of smart metering network augmented reality shopping assistance modes, according to an embodiment of the disclosure.

FIG. 21 illustrates a use-case illustrating an advanced metering infrastructure of smart metering network augmented reality shopping assistance modes, according to an embodiment of the disclosure.

Figure 22:
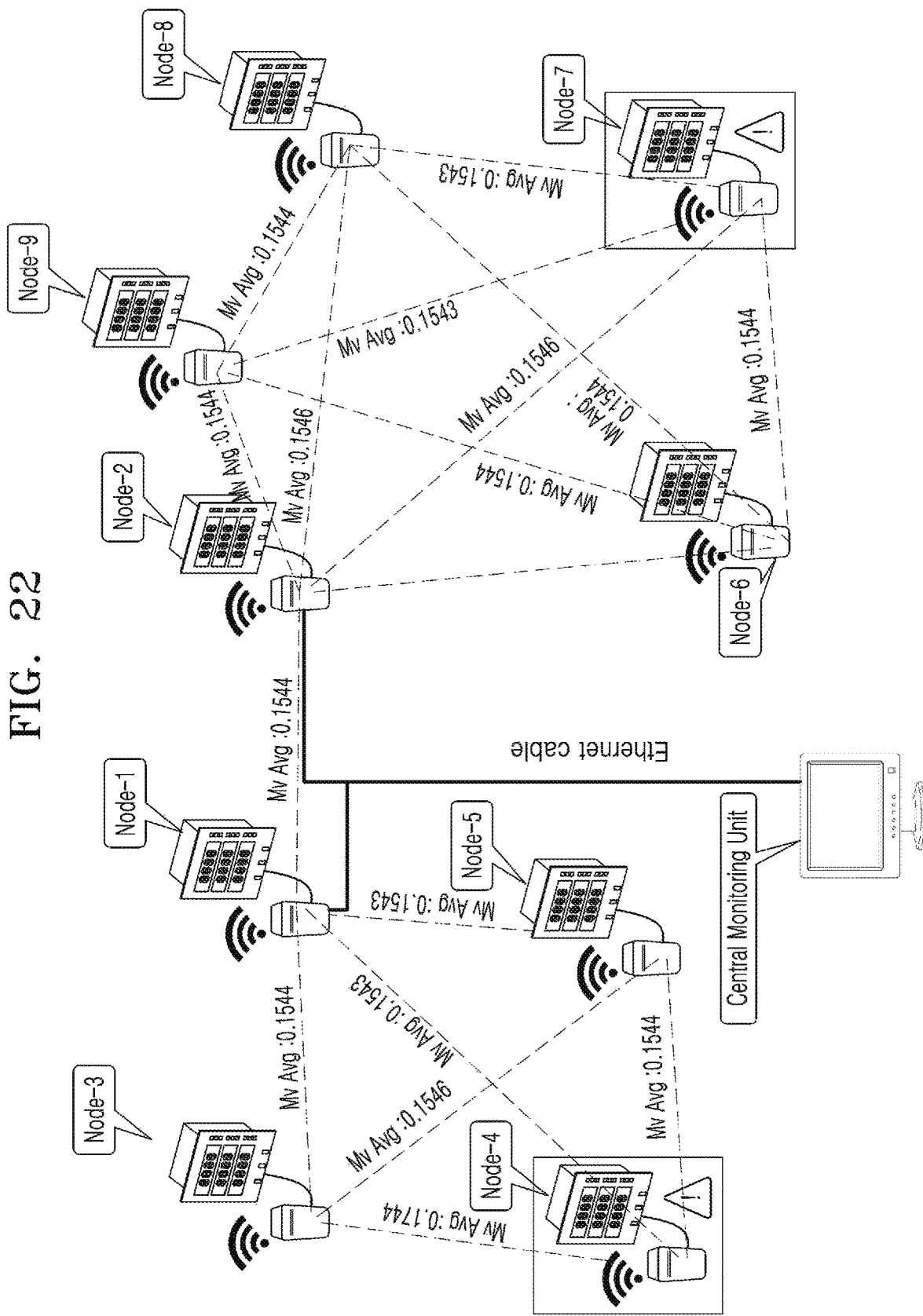
FIG. 22 is a use-case illustrating a swarm detection based on Wi-Fi signal strength, according to an embodiment of the disclosure.

Referring to FIG. 22 the smart meters are considered as IoT nodes, the anomalies can be based on any of the distance measuring algorithms. These nodes follow simple rules. We can consider the energy consumption units of smart meters as raw values or a function of raw values as transactions, these transactions are shared across nodes and the computations happen at node level. Each Smart meter is connected to an IoT bode (e.g. Raspberry PI) which has the logic for anomaly detection. Based on the Wi-Fi strength smart homes (Smart Meters) belong to different swarms.

FIG. 22 is a use-case illustrating a swarm detection based on Wi-Fi signal strength, according to an embodiment of the disclosure. The Swarm Detection Algorithm is applied to arrive at the swarm as shown in FIG. 22.

Figure 23:
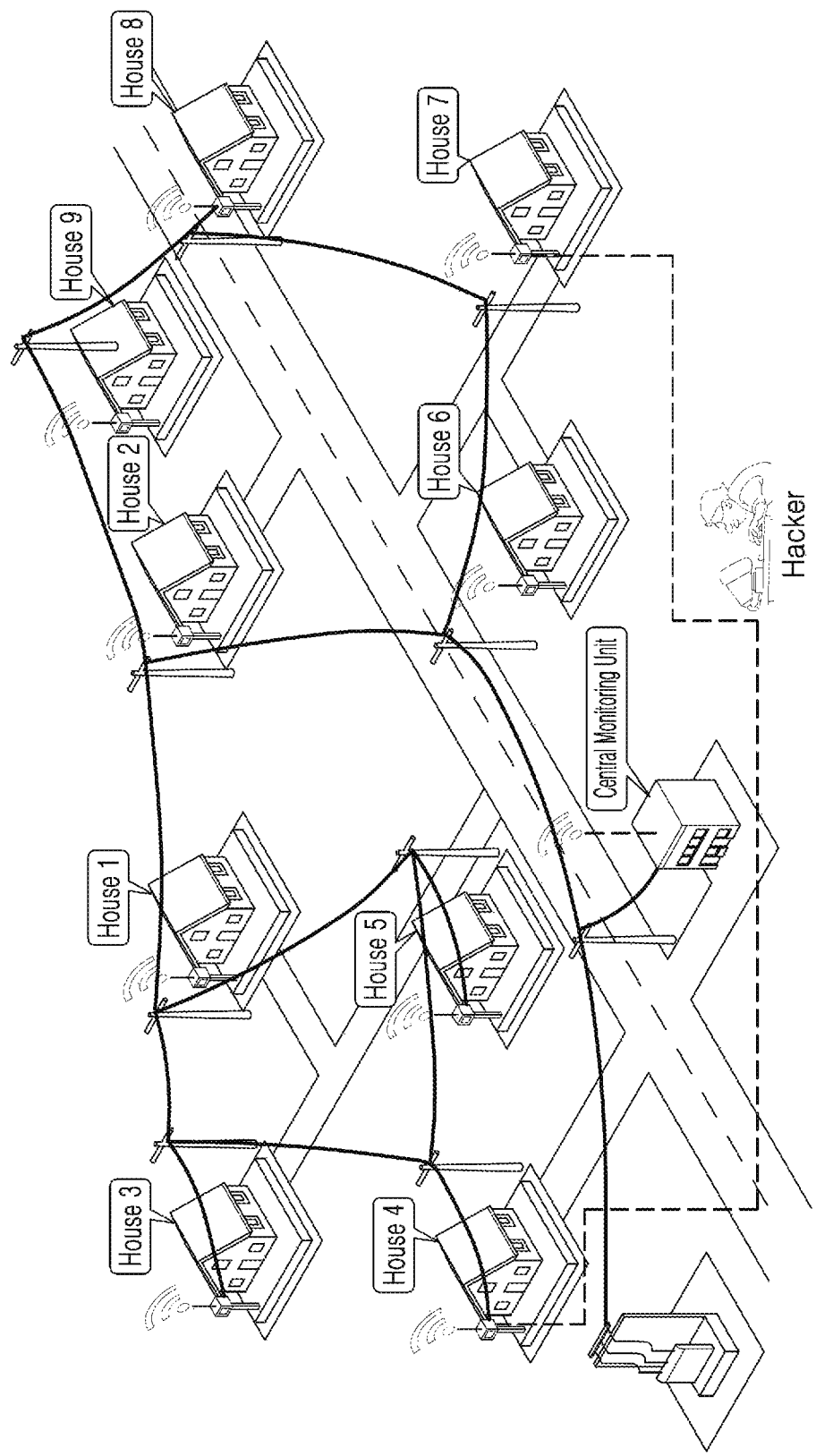
FIG. 23 is a use-case illustrating a hacker hacking a smart meter network in may-in-middle attack in an advanced metering infrastructure, according to an embodiment of the disclosure.

FIG. 23 is a use-case illustrating a hacker hacking a smart meter network in may-in-middle attack in an advanced metering infrastructure, according to an embodiment of the disclosure.

FIG. 23 illustrates a scenario where each of the houses has a smart device such as smart meter. Each of these smart meters represents a node in the swarm, all the nodes assume to have Wi-Fi capabilities and may communicate with each other. Since each smart meter represents a node and each node is connected to its nearest neighbor using a wireless link, for example, using Wi-Fi or Bluetooth capability Raspberry PI and the like. Each of nodes may be incapable to but the nodes together in a swarm are able to detect attacks.

Figure 24:
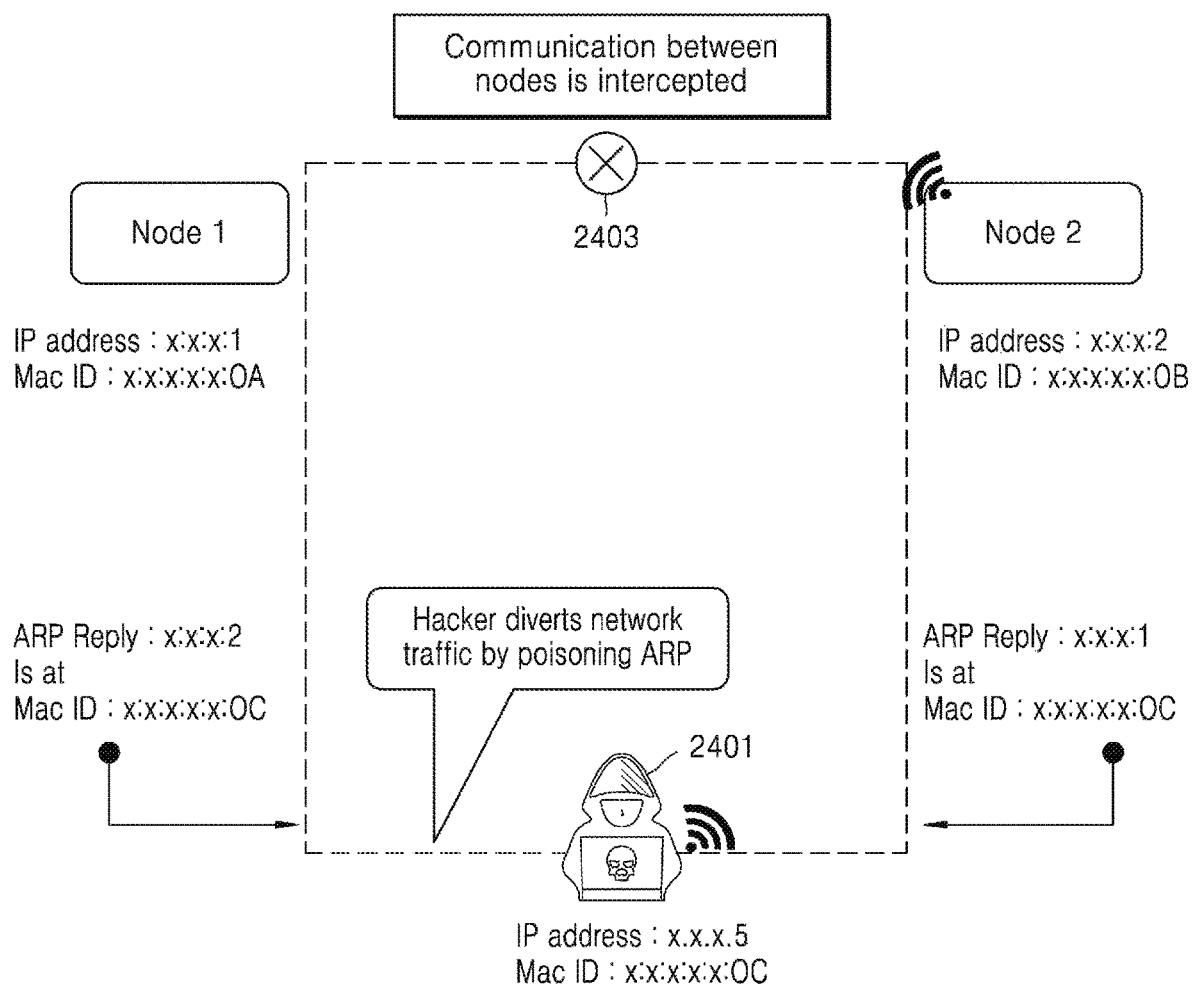
FIG. 24 is a use-case illustrating a man-in-middle attack, according to an embodiment of the disclosure.

FIG. 24 is a use-case illustrating a man-in-middle attack, according to an embodiment of the disclosure.

FIG. 24 provides a man-in-middle attach amongst the node, where in the hacker hacks the communication by using ARP poisoning methods, where the IP addresses are depicted in FIG. 24.

Figure 25:
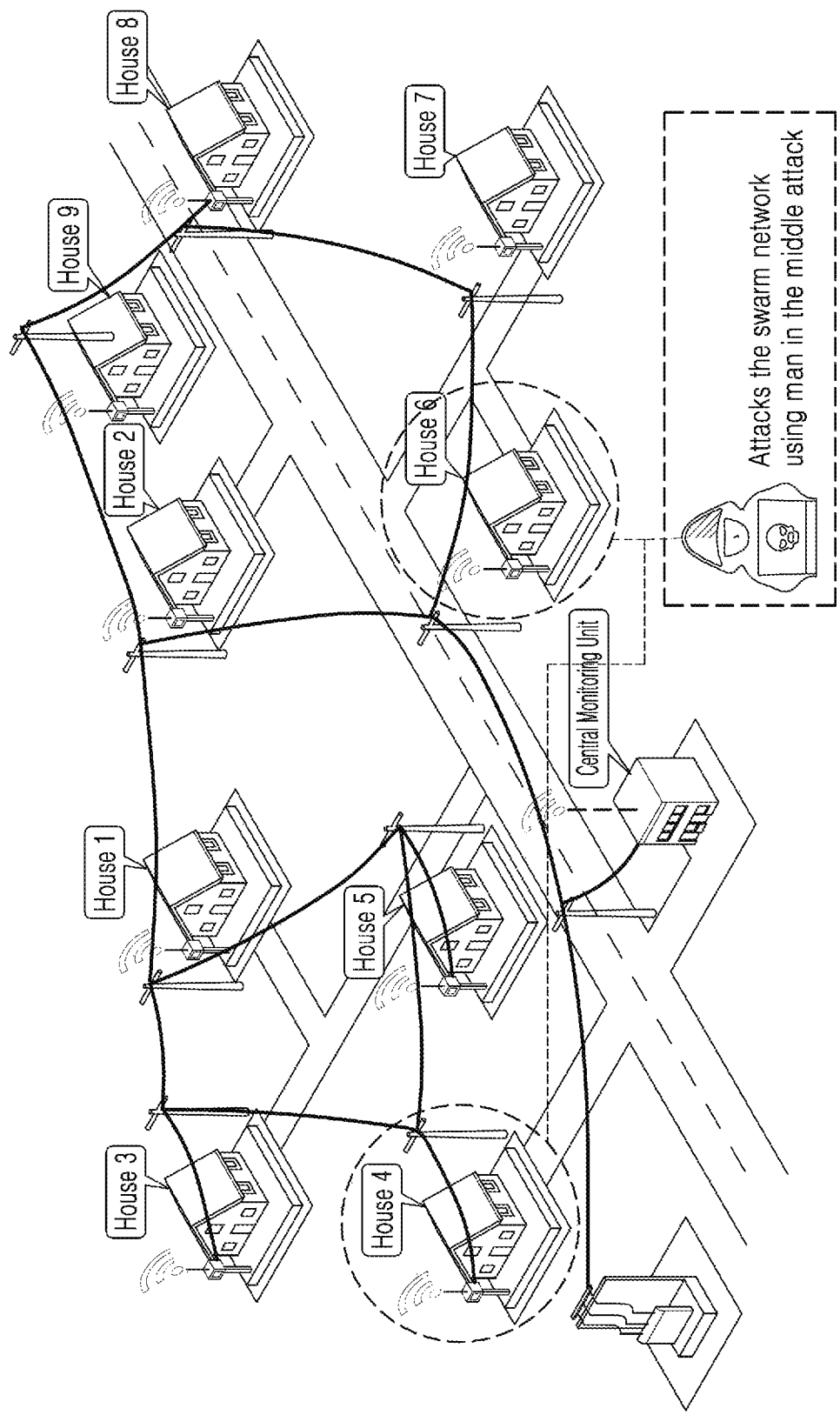
FIG. 25 is a use-case illustrating a swarm of smart energy meters detecting a malicious or anomaly node, according to an embodiment of the disclosure.

FIG. 25 is a use-case illustrating a swarm of smart energy meters detecting a malicious or anomaly node, according to an embodiment of the disclosure.

Referring to FIG. 25, the following steps are involved in the computation of anomalies:

Each node computes simple moving average of its readings for certain duration.

Each of the nodes in the swarm communicates their current simple moving average to their neighboring nodes in the swarm to which they belong.

Each node evaluates the moving average energy consumption value provided by its neighboring node against a defined threshold.

If each node detects an outlier based on the threshold, then outlier information is communicated among the neighboring nodes.

A consensus algorithm is used to arrive at detecting the anomalous or malicious node based on majority consensus or agreement by the neighboring nodes.

This method of anomaly detection is far more robust as it can detect even unknown attacks because the detection is only based on anomaly and also based on consensus among neighboring nodes, which ensures that the solution works even in case of adverse failure of some of the nodes as there is no single point of failure and scales very well.

According to an embodiment, swarm of drones can be used for effective and efficient surveillance of the land especially for smart agriculture. Instead of using a single drone for the surveillance, coordinated swarm of drones can perform the task of accurately surveying the land to identify anomalies in the growth of the crops, pest control and even areal fertilization. The inputs to the inference engine would be the characteristics of the land to be surveyed such as the perimeter, blocks of the area which needs to be independently surveyed, etc. This requires dynamic autonomous dynamic swarm formation where the generic swarm detection algorithm could be applied. Similarly, the anomaly detection algorithms parameters are vary varied for this scenario of Smart Agriculture and calls for a plug-in of Anomaly Detection Algorithms while reusing the same SIF. Hence the algorithm Plug-in Architecture is very useful for realizing these scenarios.

Figure 26:
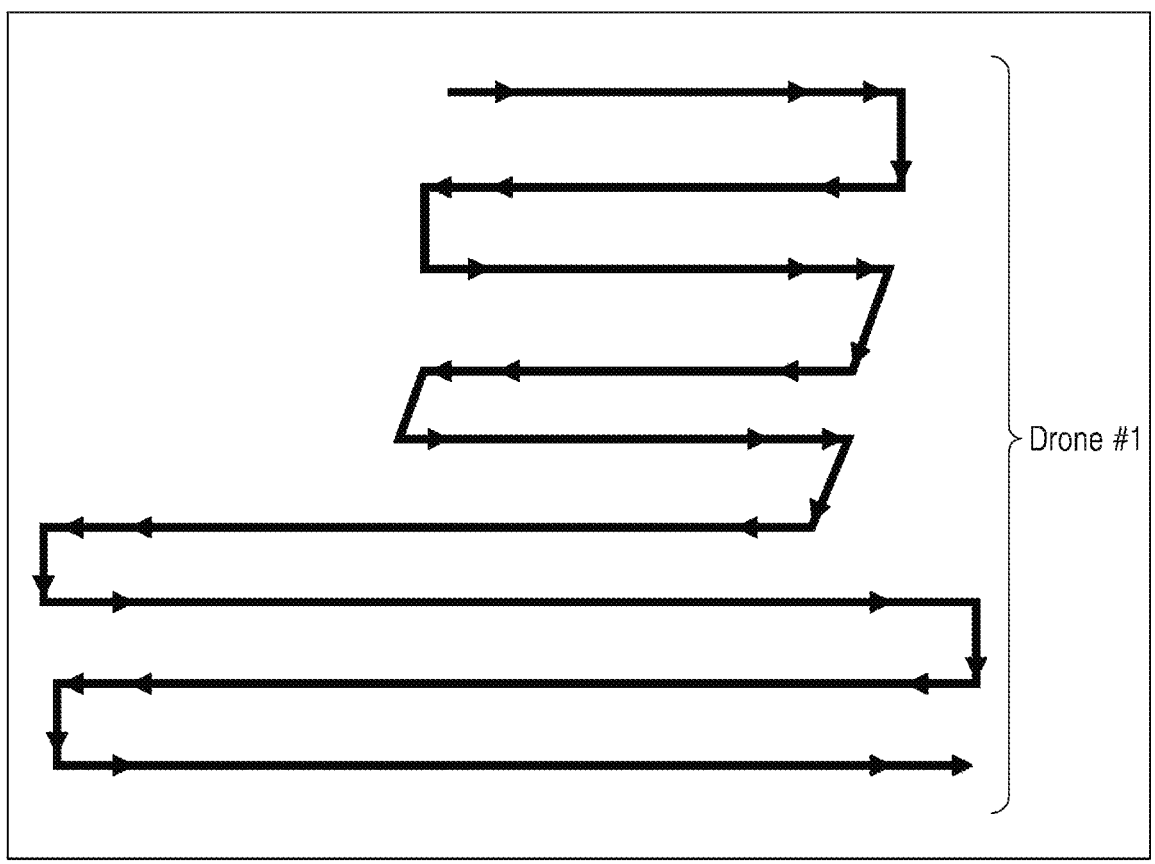
FIG. 26 is a use-case illustrating a traversal pattern of single drone for land survey, according to an embodiment of the disclosure.

FIG. 26 is a use-case illustrating a traversal pattern of single drone for land survey, according to an embodiment of the disclosure.

Referring to FIG. 26, the traversal pattern of a single drone for performing smart land surveillance is shown. This could be performed more efficiently and quickly if a swarm of drones are used and better and more efficient routing strategy can be deduced by using algorithms in swarm intelligence such as Ant Colony Optimization (ACO).

Figure 27:
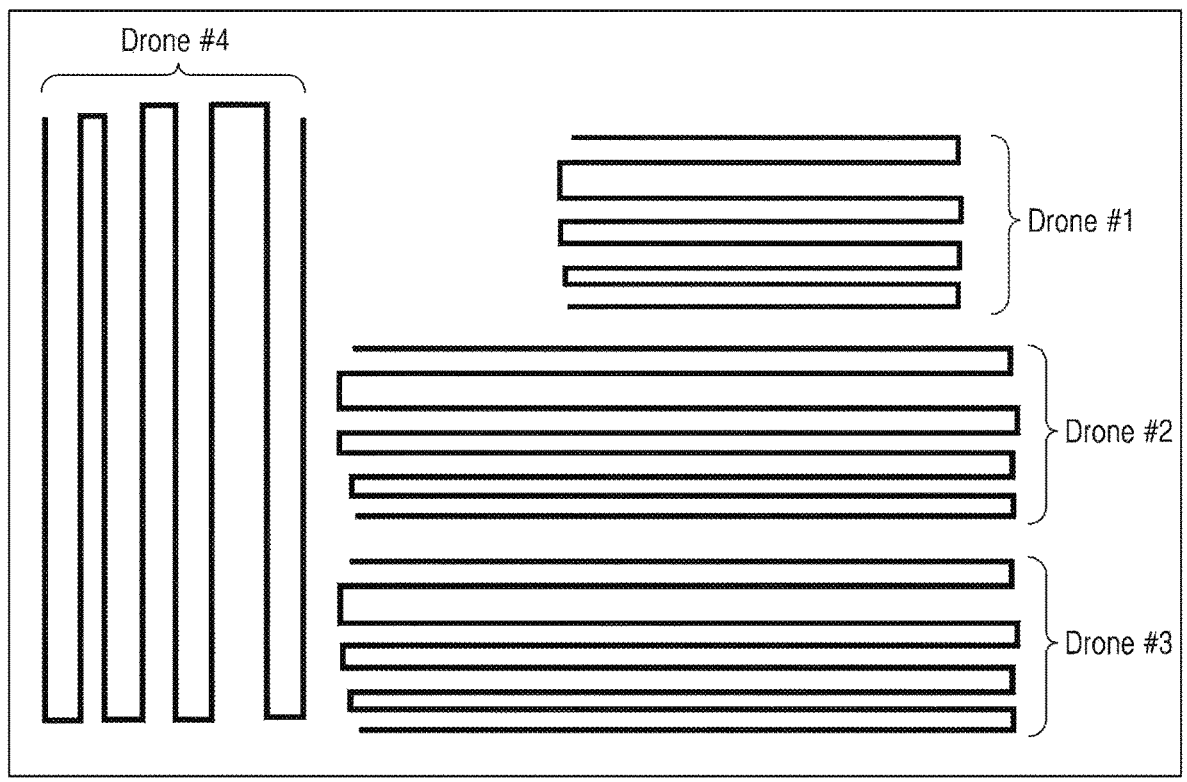
FIG. 27 is a use-case illustrating a traversal pattern of multiple drones for land survey, according to an embodiment of the disclosure.

FIG. 27 is a use-case illustrating a traversal pattern of multiple drones for land survey, according to an embodiment of the disclosure.

Referring to FIG. 27, it requires representation, detection and creation of swarm of drones and also a customized version of the ACO optimization algorithm for optimal routing strategy which is loaded by the container-based Algorithm Plug-in Architecture. Similarly, swarms of drones could be configured to complete a mission such as disaster recovery in case of detecting forest fires, surveillance during earth quakes, floods or even combing an area for border defense or security etc.

The embodiments disclosed herein can be implemented through at least one software program running on at least one hardware device and performing network management functions to control the network elements. The components shown in FIG. 2 and FIG. 3 include blocks which can be at least one of a hardware device, software module representing applications or a combination of hardware device and software module. In an embodiment, the components shown in FIG. 2 and FIG. 3 may be implemented as at least one hardware processor.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of detecting swarms in a network, the method comprising:
receiving input characteristics of nodes in the network;
generating a matrix representing a connectivity graph of devices based on the input characteristics comprising proximity among the nodes and homogeneity of the nodes;
detecting swarms based on an analysis of the input characteristics and the matrix; and
selecting at least one algorithm based on at least one predefined parameter, type of nodes, or network characteristics,
wherein the analysis of the input characteristics and the matrix comprises:
comparing the input characteristics against validation thresholds, when the input characteristics are value pairs, and representing and processing the input characteristics as a neural network, when the input characteristics are multi-dimensional parameters; and
comparing the input characteristics against at least one validation threshold, when the input characteristics are value pairs, and representing and processing the input characteristics as a neural network, when the input characteristics are uni-dimensional parameters,
wherein the at least one algorithm comprises a pluggable algorithm which is plugged-in using a container-based algorithm plug-in architecture, wherein the container-based algorithm plug-in architecture enables binary level reuse of the at least one algorithm in different applications, and wherein the at least one algorithm comprises a generic swarm detection algorithm using a set inclusion and a node degree representing a number of edges connected to at least one node among the nodes.

2. The method of claim 1, further comprising:
detecting connection and disconnection among the nodes.

3. The method of claim 2, wherein the input characteristics of the nodes further comprise at least one of network parameters, or information on connection or disconnection among the nodes.

4. The method of claim 3, wherein the proximity among the nodes indicates signal strength among the nodes.

5. The method of claim 1, further comprising:
detecting an anomalous node or a malicious node among the nodes based on consensus algorithm or an agreement by neighboring nodes in the network,
wherein the neighboring nodes are nodes located close to each other, and
wherein the consensus algorithm is plugged in a plug-in architecture.

6. The method of claim 5, wherein the detecting of the anomalous node or the malicious node comprises transmitting a detection status to an electronic device.

7. The method of claim 1, further comprising:
notifying the detected swarm to a monitoring unit.

8. The method of claim 1, further comprising:
initializing connectivity among the nodes in the detected swarm for communication; and
sharing data among the nodes in the detected swarm.

9. An apparatus for detecting swarms in a network, the apparatus comprising:
a memory to store instructions; and
at least one processor, by executing the instructions, configured to:
receive input characteristics of nodes in the network,
generate a matrix representing a connectivity graph of devices based on the input characteristics comprising proximity among the nodes and homogeneity of the nodes,
detect swarms based on an analysis of the input characteristics and the matrix, and
select at least one algorithm based on at least one predefined parameter, type of nodes, or network characteristics, wherein the analysis of the input characteristics and the matrix comprises:
comparing the input characteristics against validation thresholds, when the input characteristics are value pairs, and representing and processing the input characteristics as a neural network, when the input characteristics are multi-dimensional parameters, and
comparing the input characteristics against at least one validation threshold, when the input characteristics are value pairs, and representing and processing the input characteristics as a neural network, when the input characteristics are uni-dimensional parameters,
wherein the at least one algorithm comprises a pluggable algorithm which is plugged-in using a container-based algorithm plug-in architecture,
wherein the container-based algorithm plug-in architecture enables binary level reuse of the at least one algorithm in different applications, and
wherein the at least one algorithm comprises a generic swarm detection algorithm using a set inclusion and a node degree representing a number of edges connected to at least one node among the nodes.

10. The apparatus of claim 9, wherein the at least one processor is further configured to detect connection and disconnection among the nodes.

11. The apparatus of claim 9, wherein the input characteristics comprise at least one of proximity among the nodes, homogeneity of the nodes, network parameters, or information on connection or disconnection among the nodes.

12. The apparatus of claim 9,
wherein the at least one processor is further configured to detect an anomalous node or a malicious node among the nodes based on consensus algorithm or an agreement by neighboring nodes in the network, and
wherein the neighboring nodes are nodes located close to each other and the consensus algorithm is plugged in a plug-in architecture.

13. A non-transitory computer readable medium embodying a computer program for operating an electronic device including a memory and at least one processor, the computer program comprising computer readable program code that, when executed by the at least one processor, causes the electronic device to:
receive input characteristics of nodes in a network;
generate a matrix representing a connectivity graph of devices based on the input characteristics comprising proximity among the nodes and homogeneity of the nodes;
detect swarms based on an analysis of the input characteristics and the matrix; and
select at least one algorithm based on at least one predefined parameter, type of nodes, or network characteristics,
wherein the analysis of the input characteristics and the matrix comprises:
comparing the input characteristics against validation thresholds, when the input characteristics are value pairs, and representing and processing the input characteristics as a neural network, when the input characteristics are multi-dimensional parameters; and
comparing the input characteristics against at least one validation
threshold, when the input characteristics are value pairs, and representing and processing the input characteristics as a neural network, when the input characteristics are uni-dimensional parameters,
wherein the at least one algorithm comprises a pluggable algorithm which is plugged-in using a container-based algorithm plug-in architecture,
wherein the container-based algorithm plug-in architecture enables binary level reuse of the at least one algorithm in different applications, and
wherein the at least one algorithm comprises a generic swarm detection algorithm using a set inclusion and a node degree representing a number of edges connected to at least one node among the nodes.

* * * * *